Figure 1:
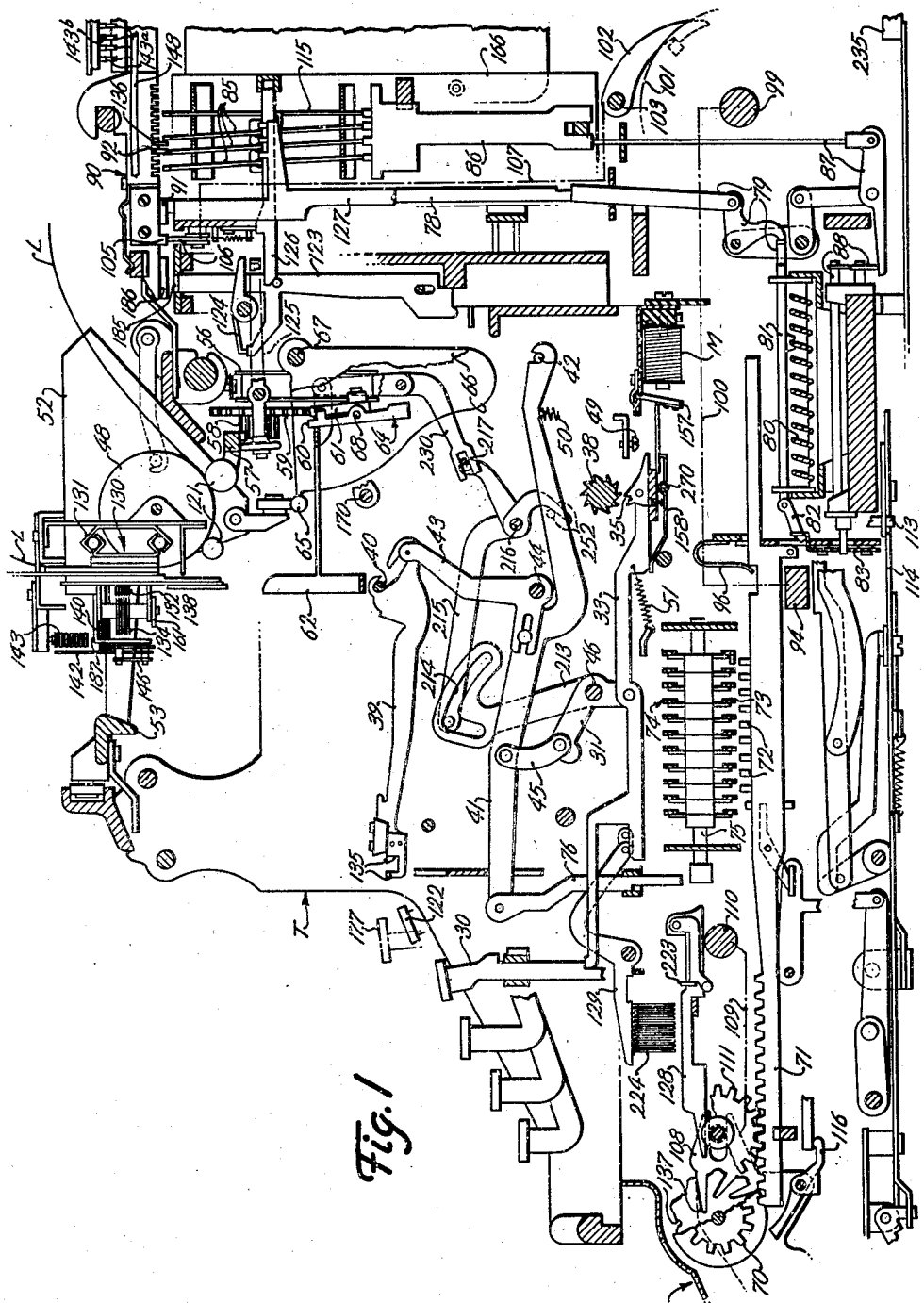

May 28, 1946.   R. W. PITMAN   2,400,949
BUSINESS MACHINE
Filed Dec. 31, 1941   9 Sheets-Sheet 1

INVENTOR
RICHARD W. PITMAN
BY
ATTORNEY

May 28, 1946.                R. W. PITMAN                2,400,949
                            BUSINESS MACHINE
                         Filed Dec. 31, 1941           9 Sheets-Sheet 2
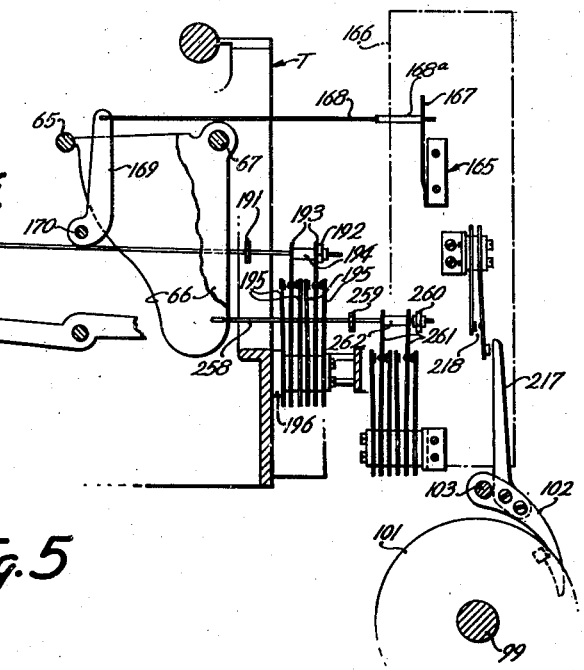
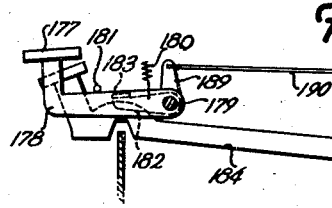
INVENTOR
RICHARD W. PITMAN
BY
ATTORNEY

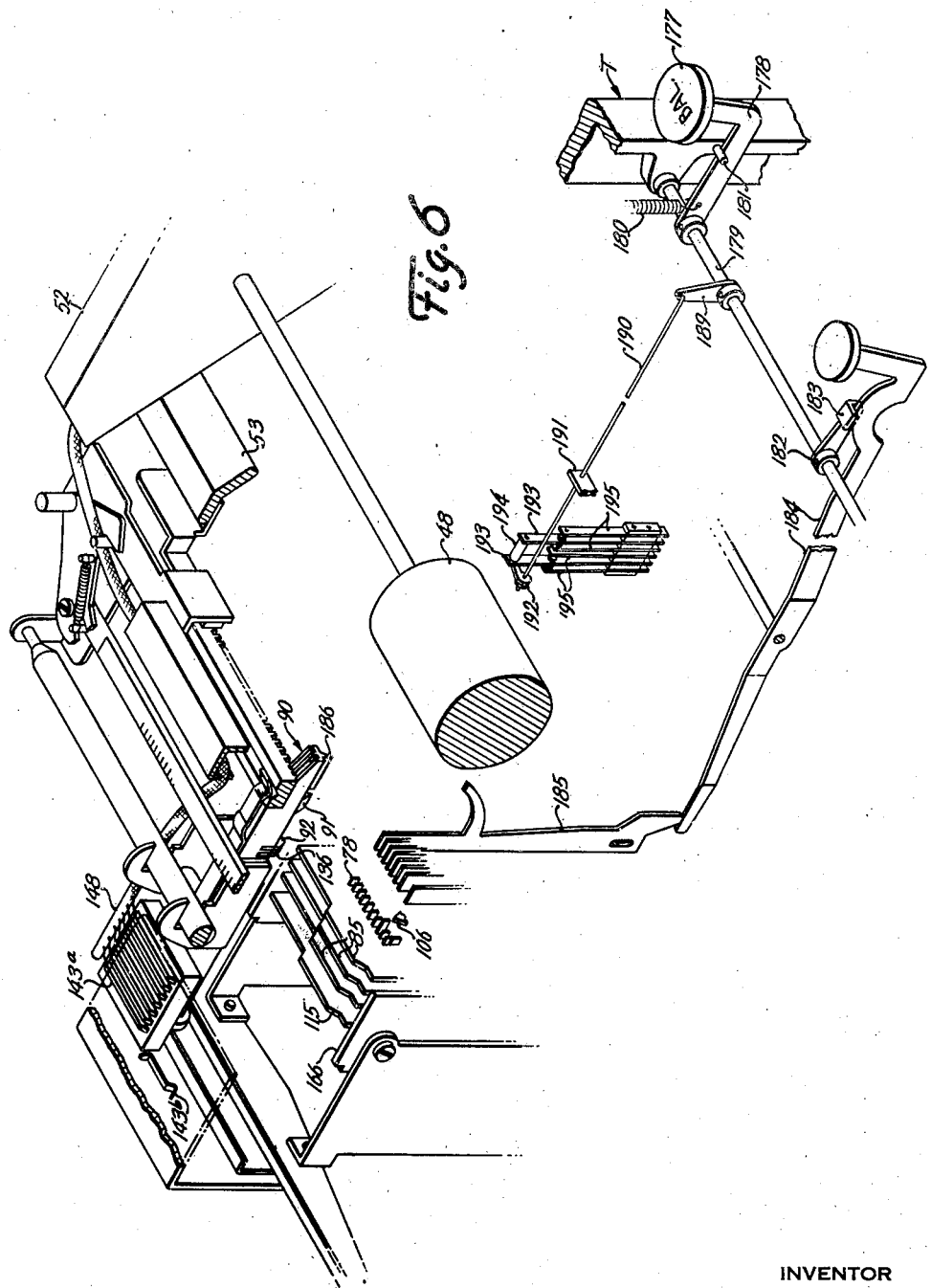

May 28, 1946.  R. W. PITMAN  2,400,949
BUSINESS MACHINE
Filed Dec. 31, 1941  9 Sheets—Sheet 4
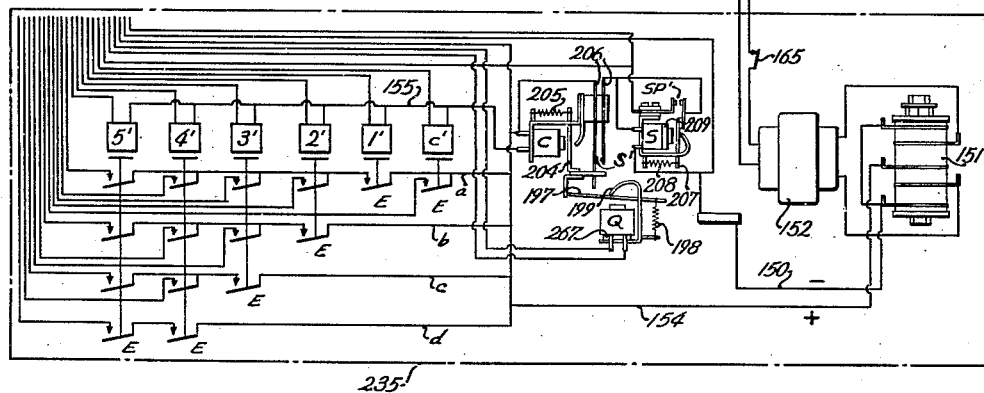
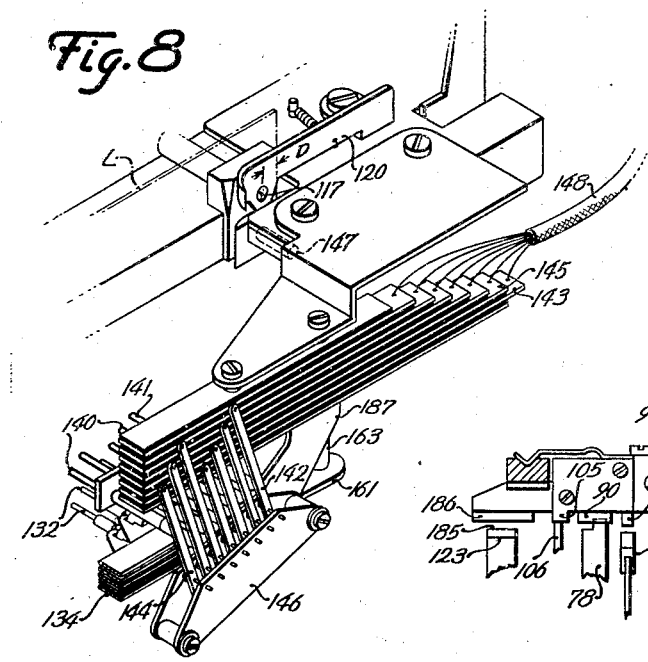
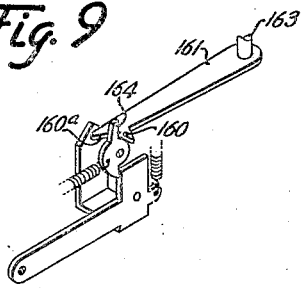
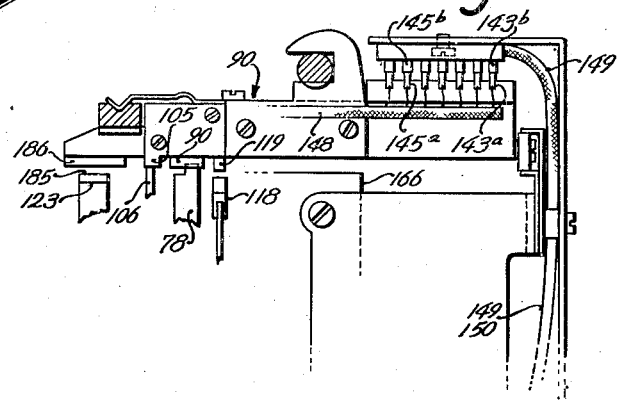
INVENTOR
RICHARD W. PITMAN
BY
ATTORNEY May 28, 1946.   R. W. PITMAN   2,400,949
BUSINESS MACHINE
Filed Dec. 31, 1941   9 Sheets-Sheet 5

INVENTOR
RICHARD W. PITMAN
BY
ATTORNEY

May 28, 1946.    R. W. PITMAN    2,400,949
BUSINESS MACHINE
Filed Dec. 31, 1941    9 Sheets-Sheet 9
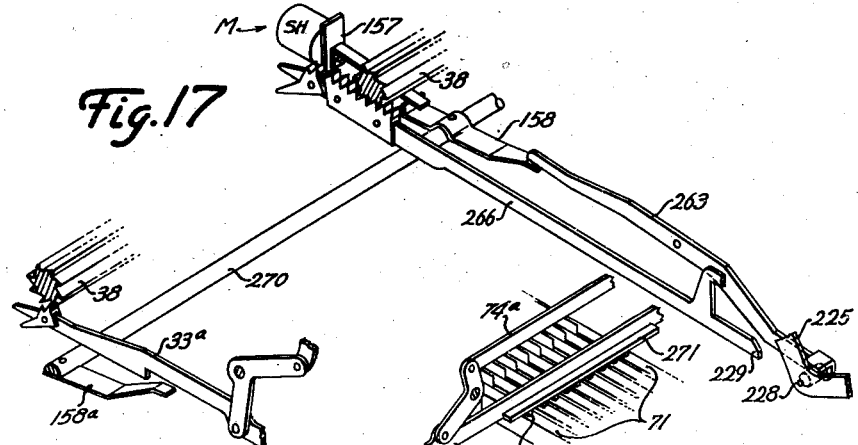
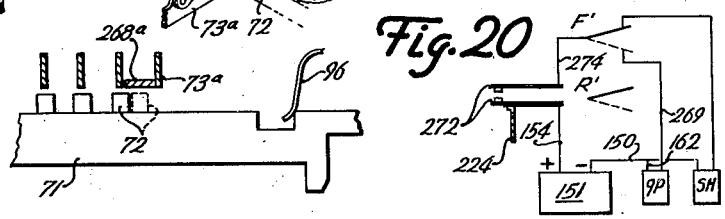
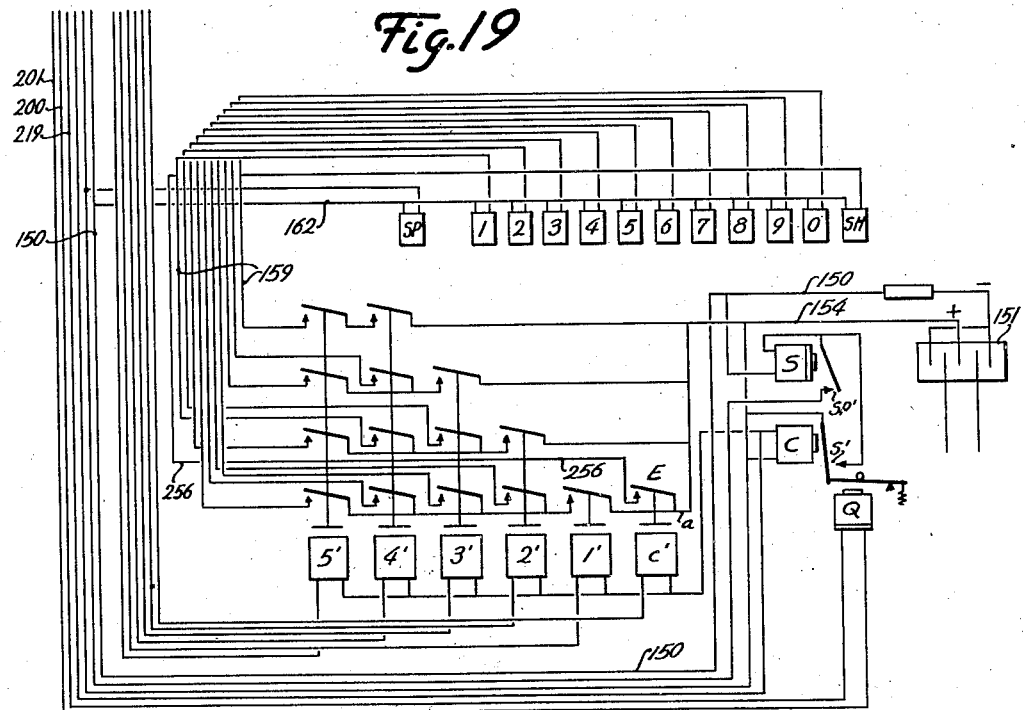
INVENTOR
RICHARD W. PITMAN
BY
ATTORNEY Patented May 28, 1946

2,400,949

UNITED STATES PATENT OFFICE 2,400,949

BUSINESS MACHINE

Richard W. Pitman, West Hartford, Conn., assignor to Underwood Corporation, a corporation of Delaware Application December 31, 1941, Serial No. 425,100

21 Claims. (Cl. 235—60)

This invention relates to business machines of the kind exemplified in my copending applications, Serial No. 102,389, filed September 24, 1936, now Patent No. 2,278,118, and Serial No. 419,389, filed November 21, 1941; it relates more particularly to mechanism, including a carriage, for facilitating the bringing of the first-significant-figure place, of a sensably-recorded amount on a ledger sheet, and a sensing device into register.

Such machines are used to record on a ledger sheet changing balances of an account. As each balance is newly computed from a previous balance and credits or debits, it is recorded by perforating the sheet to readably represent the individual digits of the balance, such perforating being done in the present kind of machine digit-by-digit and, therefore, involving use of a letter-feed mechanism, including a carriage of a typewriter.

After receiving the perforated new balance, the sheet may be removed from the machine. When a later entry is to be made, the sheet is again inserted in the machine, and the letter-feed mechanism, including the carriage, and a digit-sensing device are caused to cooperate to sense the previously perforated balance digit-by-digit preparatory to entering the new credit or debit and obtaining and perforating a further new balance.

The arrangement is such that as soon as the first-significant-figure perforation and the sensing device are brought into registration by means of the carriage, the sensing proceeds automatically digit-by-digit to and including the last or lowest order digit of the balance.

The perforated balance may comprise any number of figures up to the capacity of the new balance column of the ledger sheet. If the column capacity is, say, 8 places or orders, and the balance is one with only 3 figures, as for example, the balance 7 38 then only these three figures will be represented by perforations in the column and the higher places of the column generally will be blank or unperforated.

Inasmuch as the digit-by-digit automatic sensing of the balance does not proceed until the first-significant-figure perforation and the sensing device are in register, the ledger sheet and sensing device must first be relatively positioned, by means of the carriage, according to the place or order of the first significant figure in the perforated balance. This may be done by operating an appropriate denominational tabulating key or by operating the space key repeatedly to bring the carriage from a starting position to the position corresponding to the first-significant-figure of the balance. But this requires that the typist note the place or order of the first significant figure in the balance and accordingly select and operate the proper denominational tabulating key or operate the spacing key the proper number of times. This consumes time and labor and there is liability of error.

The general object of the invention is to relieve the typist of such responsibility by providing means operable automatically to bring the first-significant-figure perforation place of a sheet and the sensing device into registration to start the digit-by-digit sensing.

Another object of the invention is to provide a key or control operable by the typist for resulting operation of such means. There being only one key, and only one operation thereof being necessary, there is gain and advantage over the procedure of noting the order of the first significant figure and selecting and operating a denomination tabulating key or operating a space key a variable number of times.

In the preferred embodiment of the invention, the operation of such single key causes the carriage to become positioned suitably in advance of the position corresponding to the first-significant-figure perforation and also determines that the aforesaid means will operate, according to each blank or unperforated figure-place of the sheet to advance the carriage step-by-step from such advance position to the first significant figure position.

Another object of the invention is to provide for automatically cutting-out the automatic operation of said step-by-step feeding means consonantly with the sensing of the first-significant-figure perforation.

It might occur that the balance column is entirely blank or unperforated. In such case, said automatic step-by-step feeding means would tend to continue operating indefinitely beyond the balance column. Another object of the invention, therefore, is to provide for automatically terminating the operation of said automatic means so that such operation does not continue indefinitely beyond the last or lowest order place of the balance column.

The perforations representing the balance may correspond to either a positive balance or to the complement of a true negative balance. Like in the case of a positive balance, only the significant figures of the complement of the negative balance are represented by perforations, any higher places being left blank or unperforated. However, an extra perforation in the sheet indicates that the perforations represent the complement of a true negative balance and that there must be performed certain machine operations relative to this sensing of the complement; thus, in the present machine, the insignificant-nines corresponding to blank spaces must be accounted for in a computing mechanism, and a printing mechanism may be adjusted to print the true negative balance with the sensing operation.

Another object of the invention is to correlate, under control of said extra hole and the aforesaid key, the operation of an insignificant-nines-entering device and of the printing mechanism adjusting means with the operation of the means for automatically bringing the first significant figure perforation of the complement into registration with the sensing device. The result will be that for each blank or unperforated insignificant-figure place, the corresponding complemental nine will be entered and the true negative balance will be printed when the complemental perforations are sensed.

In any case, whether the perforations represent a positive balance or a negative balance, there will also be entry of the same in the computing mechanism; and in the present machine, the figures of the positive balance also will be printed when the corresponding perforations are sensed.

Another object is to carry out the invention by simple, efficient devices.

Another object is to adapt such devices for a machine of a kind disclosed in the aforesaid copending applications, for example, said application Serial No. 419,889, wherein the sensing operations control electrical circuits, including relays and operating magnets, to determine machine operations including spacing of the carriage. In the preferred embodiment of the present invention, the desired automatic spacing of the carriage is determinable by means comprising simple supplementary electro-magnet devices and control circuits therefor.

The foregoing and other features, objects and advantages of the invention will hereinafter appear.

Figure 11:
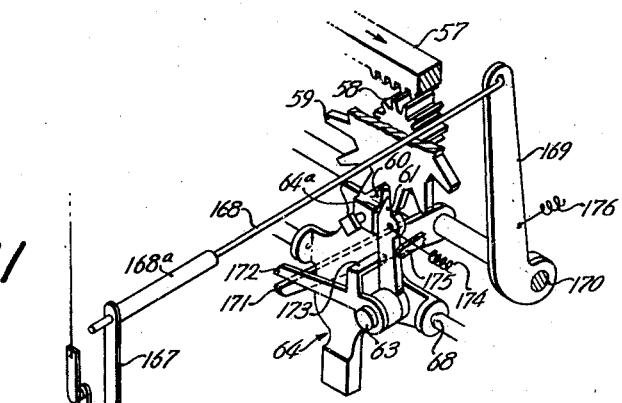
Figure 12:
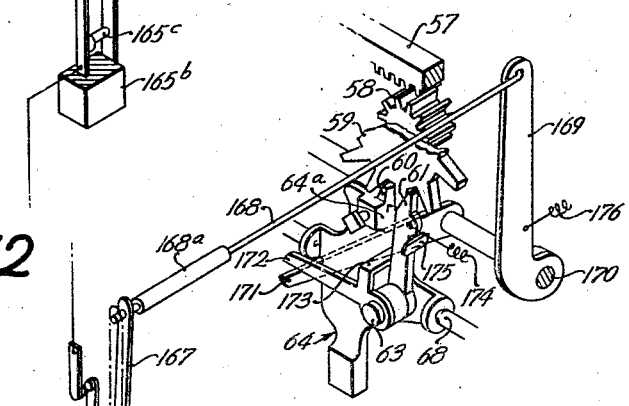
Figure 13:
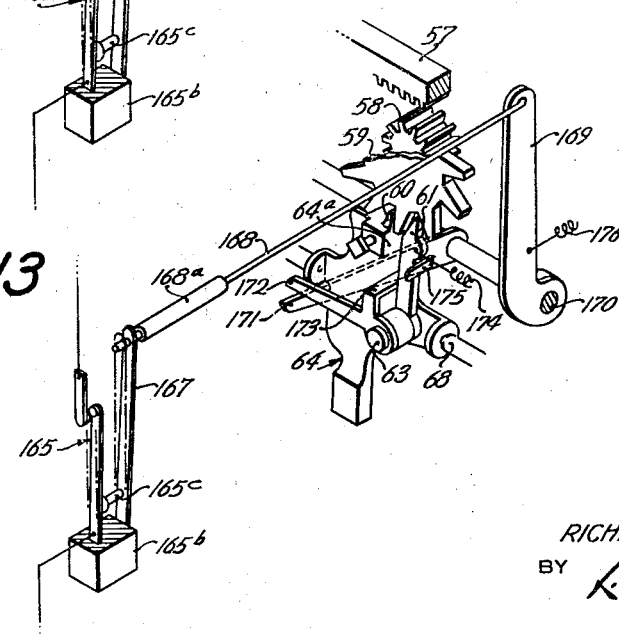
Figure 14:
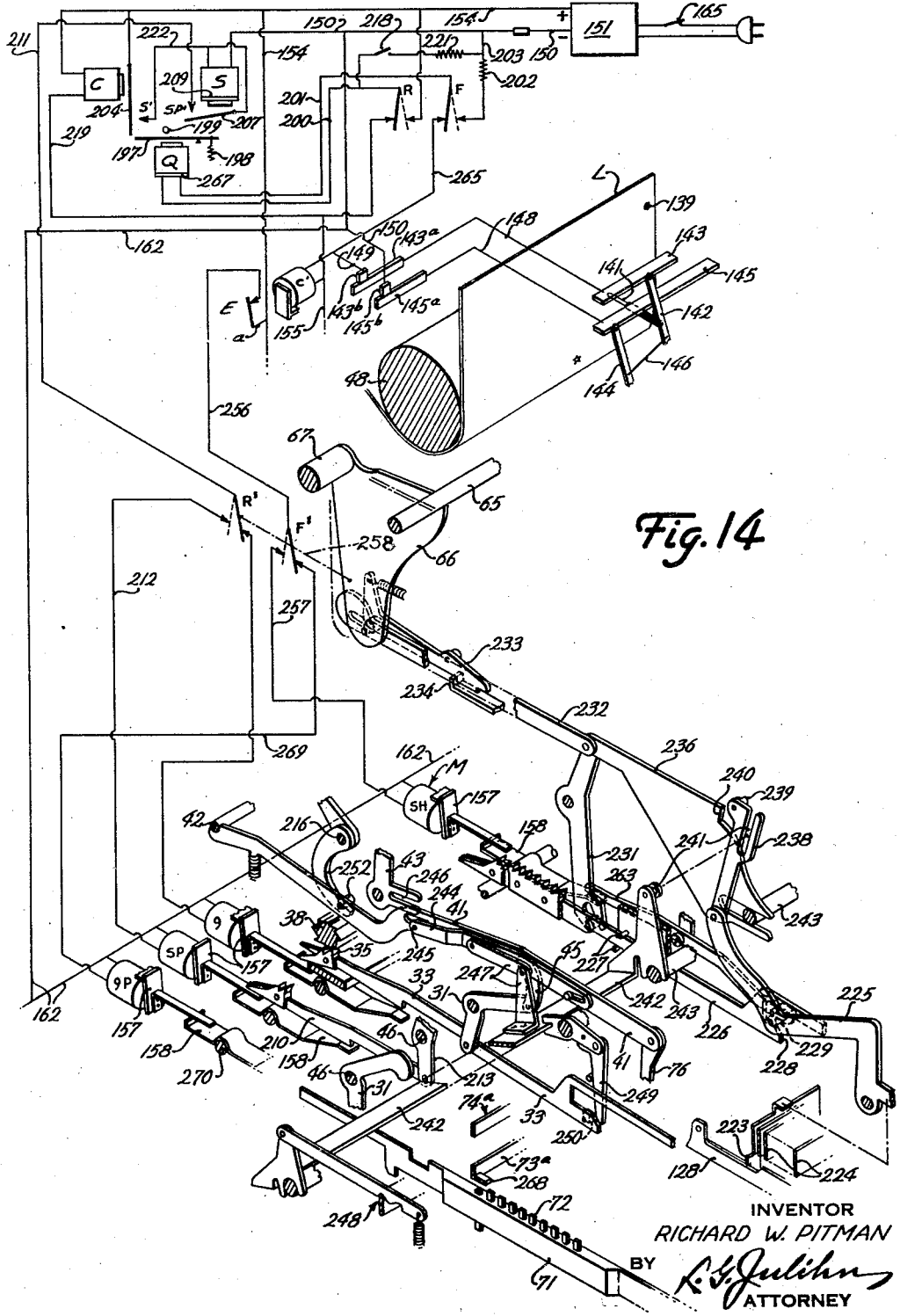
Figure 15:
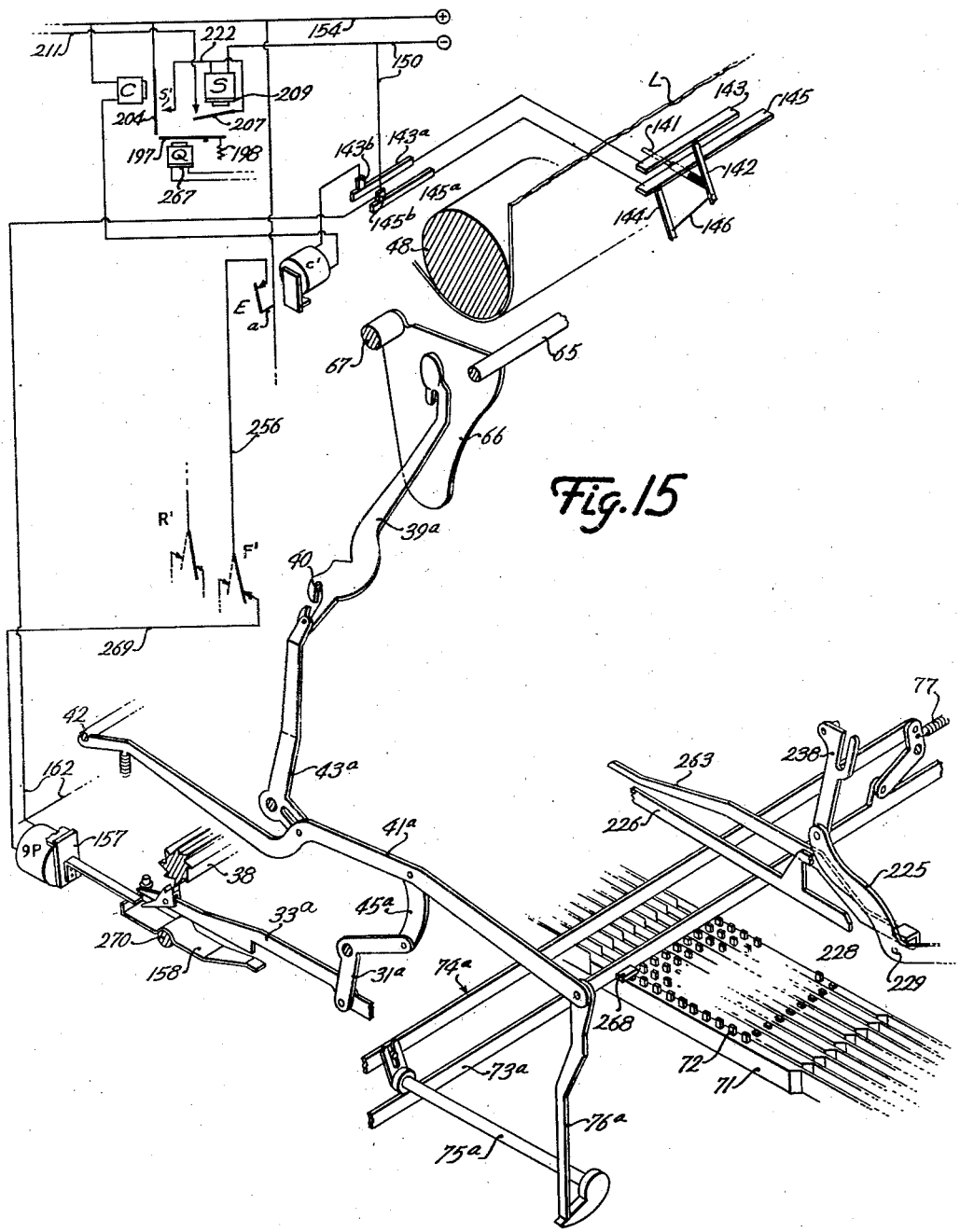
Figure 16:
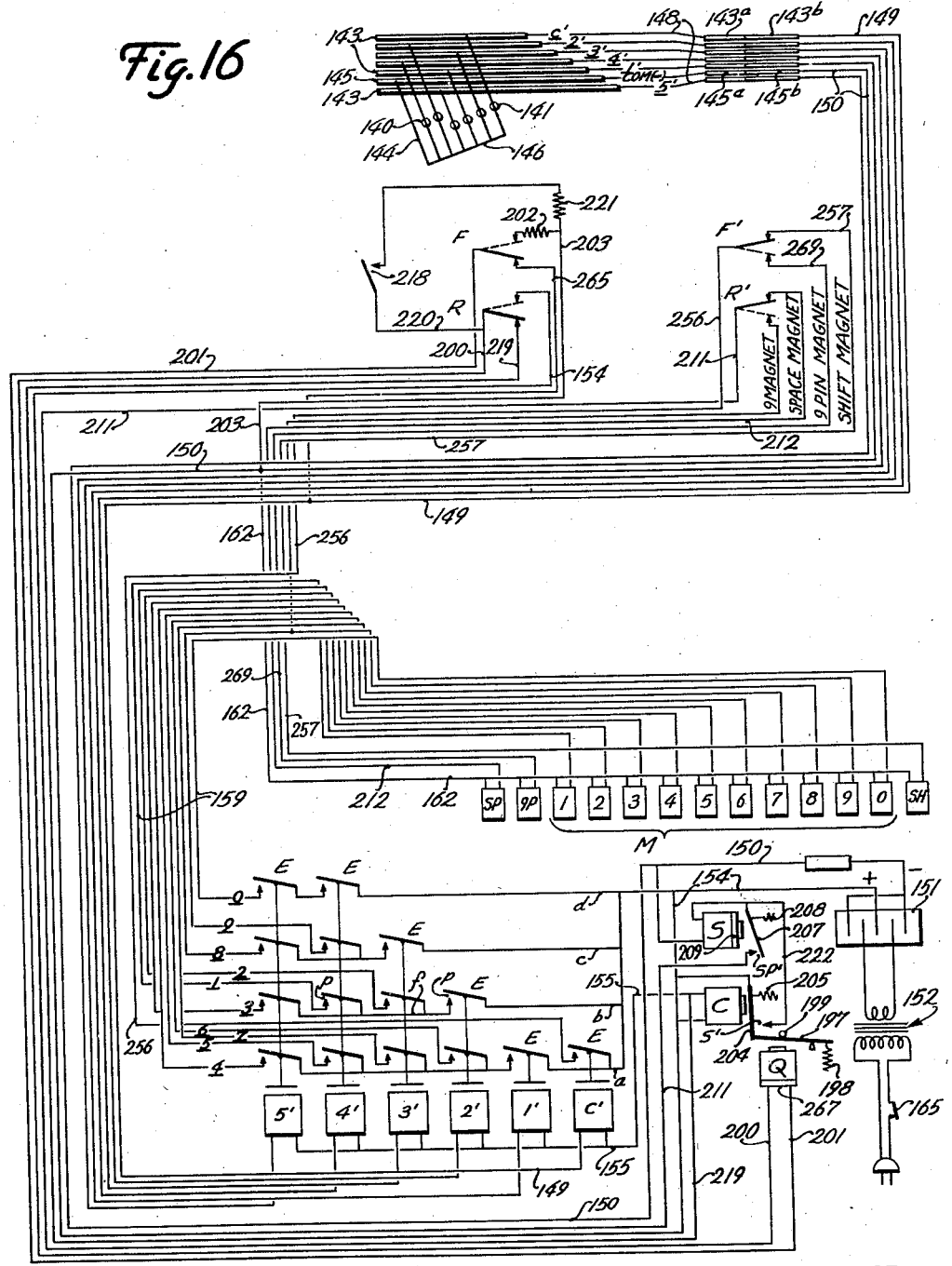

In the accompanying drawings:

Figure 1 is a cross-sectional side elevation of a combined typewriting and computing machine to which the invention is applied, Figure 2 shows a ledger sheet, Figure 3 is a diagram of groupings of punches and sensing pins, Figure 4 is a cross-sectional side elevation of the machine showing the balance key and connections, Figure 5 is a tabulation of the types, punching and sensing code, and relay magnets, Figure 6 is a perspective of the carriage, balance key and connections, Figure 7 is a top plan view of the magnet and relay assembly, Figure 8 is a perspective of parts of the carriage and the punching and sensing head, Figure 9 is a perspective of stop mechanism for said head, Figure 10 is a side view of a column unit on the carriage and parts traversed thereby, Figures 11, 12 and 13 are perspectives of the escapement mechanism and connections to a universal switch as seen from the rear of the machine, Figure 14 is a perspective showing the sensing of a credit balance hole and the mechanisms and circuits controlled by the sensing, Figure 15 is a perspective showing the sensing of a credit balance hole, and nine-pin setting mechanism and circuits controlled by the sensing, Figure 16 is a circuit diagram, Figure 17 is a perspective showing a modification relating to 9-pin setting, Figure 18 is a side view of a detail relating to 9-pin setting, Figure 19 is a circuit diagram relating to the mechanism of Figure 17, Figure 20 is a circuit diagram relating to modified total-taking control of 9-pin setting in the highest computing wheel driver.

General description of machine

Each of operating levers 31 for the several numeral type actions, of a typewriter T on a computing base B, has a draw link 33 to which is pivoted a dog 35. A snatch roll 38 is continuously rotatable by a motor drive, not shown. Each numeral type action includes a type bar 39, fulcrumed at 40 in the type-bar segment, and a lever 41 fulcrumed at 42. Intermediate bell cranks 43 fulcrumed at 44 connect type bars 39 to levers 41 connected by links 45 to levers 31 fulcrumed at 46.

Depressing a numeral key 30 lifts the companion draw link 33 to engage its dog 35 with snatch roll 38 whereby the type action is operated to print against a platen 49. Before the type bar reaches the platen, draw link 33 encounters a knock-off 49 and becomes disengaged from snatch roll 38 and the type action completes the printing stroke by momentum. The type action is returned to normal by springs 50 and 51.

Platen 49 is in a frame 52 case shiftable in a main carriage 53 guided for lateral travel. Letter-feed mechanism comprises a carriage-driving spring motor 55, a feed rack 57 and pinion 58, an escapement wheel 59 coupled to pinion 58, and a universal bar 62 operable by the type bars 39 to actuate a dog rocker 64 on which 60 is the holding dog and 61 is the stepping dog mounted on a pivot 62. Dog rocker 64 is rockable about pivots 63. A case shift rail 65 for platen frame 52 is connected to side plates 66 fulcrumed in the main frame at 67.

There may be, say, three laterally spaced sets of computing wheels 70, forming three totalizers, and three sets of drivers 71. Pin-setting linkages 73, 74 are connected to companion rock shafts 75 actuatable by rods 76 pendent from the type action levers 41. Springs 77, Figure 15, return the pin-setting linkages and rock-shafts. The computing wheel drivers 71 normally stand with their index pins 72 out of the paths of the pin setting bars 73.

A single set of denominational jacks 78, Figures 1, 6 and 10, has connections 79 to corresponding transverse blades 80 rockable about their lower edges and connected to sets of distributive racks 81 in tandem with the sets of drivers 71. Each set of racks 81 has a set of couplers 82 liftable by a plate 83 into position to connect the set of racks 81 to its set of drivers 71. Totalizer-selecting cam plates 85 have operating connections 86, 87, 88 to corresponding coupler lifting plates 83.

For each computing zone, the carriage has a column unit 90 having a tappet 91 for engaging the denominational jacks 78, and a totalizer selecting tappet 92 for keeping a predetermined cam plate 85 depressed while the carriage is in the zone. As the carriage moves through the zone at operation of the numeral type actions, the jacks 78 are depressed seriatim by tappet 91 and thereby the computing wheel drivers 71 of any set that has been operatively connected to the jacks 78 by depression of the corresponding cam plate 85 by tappet 92, are displaced endwise seriatim to bring their pins 72 under the pin setting bars 73 so that the numeral type action operations index the amount.

A reciprocatable general operator cross bar 94 advances the drivers 71 to extents corresponding to the digit pins 72 which were depressed. Returning, the bar 94 returns drivers 71 to their normal positions. A spring device 95 returns the driver slightly beyond bar 94 to permit the drivers to be advanced slightly to pin setting position. Spring device 96 also retracts the slightly advanced driver 71 when carriage tappet 91 leaves the corresponding jack 78.

A shaft 99, Figures 1 and 4, is operable in a one-revolution cycle to reciprocate bar 94 through a driving connection diagrammatically represented at 100. A disc 101 tends to turn on shaft 99 to close a clutch, not shown, to connect shaft 99 to a power drive, not shown, for an ensuing cycle. A clutch control dog 102 on a shaft 103 normally restrains disc 101. As the carriage steps from the lowest order jack 78, a cycle trip tappet 105 on column unit 90 overrides a cycle trip lever 106 to displace the clutch dog 102 to initiate a cycle; an operative connection between cycling trip lever 106 and dog 102 is diagrammatically represented at 107.

Each set of computing wheels 70 is in a frame 108 having an operative connection, diagrammatically represented at 109 to a shaft 110 of the general operator mechanism so that the wheels are shifted into and out of connection with their drivers during the cycle. Frame 108 is shiftable for connecting the wheels 70 either directly with drivers 71 for addition or with driver idlers 111 for subtraction. Carriage-operation of the corresponding cam plate 85 and a connection, not shown, lifts a latch 113 from a state control bar 114 for consequent spring-urged forward shift of the latter to an add position against a secondary latch, not shown. Retraction of the secondary latch as by a subtraction cam plate 115 operable by column unit 90 results in further forward shift of bar 114 to a subtract position. The add and subtract positions of bar 114 determine, by means of mechanism not shown, connection of the wheels 71 to the drivers directly or to the idlers 111.

Carryover mechanism, partly represented at 116, is controlled by the computing wheels 70 to determine extra steps of carryover advance of the computing wheel drivers 71.

*Positioning the work sheet*

A new ledger sheet L, Figures 2 and 8, is positioned around the platen so that the first entry line is at the printing line and so that the right edge of the sheet is a predetermined distance D to the right of a locating pin 117 which is usable as will be explained later. The new sheet is placed between the front end of pin 117 and a finger 120 pivotally supported, on platen frame 52 which also mounts pin 117, for forward displacement to admit the ledger sheet.

Bottom feed rolls 121 cooperate with platen 48 to hold the ledger sheet in place after it has been positioned.

*Making the first line entry on the work sheet*

The first entry 90 14 is now typed in the old balance column for which there will be a column unit 90 on the carriage so that the entry is also indexed in the drivers 71 for the set of computing wheels which the unit 90 selects by depressing a predetermined one of the cam plates 85. The general operator is then cycled to run the indexed entry into the totalizer. After typing entries in the descriptive columns, the debit column entry 7 29 is typed and is concomitantly indexed in the drivers 71 for the same totalizer that received the old balance 90 14. The general operator is then cycled to add the debit entry in said totalizer which then registers a new positive balance 97 43. Then the carriage is advanced to the balance column of the ledger sheet.

Preferably, the new balance is printed automatically in the balance column. Operation of a total key 122, partly shown, Figure 1, lifts a reed 123 to rock levers 124 and 125 to lift carriage rack 57 from pinion 58 for resulting advance of the carriage to a tabulating counterstop 118, Figure 10, which, by a connection not shown, is lifted by reed 123 to engage a stop 119 on column unit 90. Lifted reed 123 displaces a rod 126 to tilt the cam plates 85 rearwardly to connect them with corresponding jacks 127. The operation and release of total key 122 brings the carriage to a position a letter space higher than the highest order of the balance column which has a capacity of, say, eight places for amounts up to 999,999 99. At said position, a tappet 136, Figure 1, depresses the tilted cam plate 85 for the totalizer from which the total is to be printed and thereby depresses the corresponding jack 127 to cause release of a corresponding set of total readers 128 to engage digit stops 137 on computing wheels 70 for assuming positions representing selection of operating levers 129 for the type action draw links 33 which are to be operated for printing the total. Each reader 128 has a finger 223 which becomes positioned under such one of blades 224 as corresponds to the reader position. Each blade is operatively connected to a corresponding lever 129. The depression of jack 127 also results in operative connection, by means not shown, of the drivers 71 to said fingers 223 so that the latter will be lifted seriatim, to lift blades 224 to operate levers 129 to connect the corresponding numeral type actions in proper order to the snatch roll, by the seriatim advance by the carriage of the drivers 71 to pin-setting positions.

The totalizer has nine wheels of which the highest is used in detecting an overdraft; the other eight wheels correspond to the eight places of the balance column. The position at which the carriage becomes placed by operation of total key 122 corresponds to this highest wheel. In accordance with this highest and succeeding wheels registering insignificant zeros, for a positive total, or insignificant nines, for a negative total, a carriage spacing mechanism, which will be referred to later, is automatically operated to advance the carriage step-by-step, without printing, to the first significant figure position at which the selected numeral type action is automatically connected to snatch roll 38 and operated. The typing of the other significant figures then progresses automatically and there is also automatic passage of the carriage over the punctuation space between dollars and cents.

If the registered amount is an overdraft, the highest computing wheel will register nine and all the other wheels will register the nines complement of the true overdraft. A case shift mechanism, referred to later, becomes operated under control of the highest wheel, if the latter registers nine, to case shift platen frame 52 so that the true overdraft will be printed even though the wheels register its nines complement. Each numeral type bar 39 has an upper case numeral type that is the nines complement of its lower case numeral type. Either the positive total or the nines complement of the overdraft, as the case may be, is indexed in the computing wheel drivers 71 so that in the cycle following total printing the indexed amount is subtracted to clear the totalizer. The cycle also restores the machine to non-total-taking condition.

*Punching the new balance in the work sheet*

A sub-carriage 130, Figure 1, is supported by trackways 131 on platen frame 52 of the carriage and mounts a group of five punches 132 arrayed as in Figure 3. The punches are operable two at a time to punch representations 133 of the digits according to the Figure 5 code. The representations 133 are punched at the right of the balance column, Figure 2, by operation of the numeral type bars 39 as the latter type in the balance column. Punch operating levers 134 have a vertical fulcrum axis on sub-carriage 130 and to the right of the punch group and present leftwardly a group of ends, not shown, toward the typing point. Each numeral type bar 39 has a pair of strikers 135 for striking the two lever ends and thereby operating the two punches that correspond to the lower case digit value of the type bar. The sub-carriage 130 is spring-coupled to, and travels leftwardly with, the main carriage until the latter reaches the position in the balance column zone corresponding to the highest of the nine computing wheels. At this position, the sub-carriage 130 is arrested by a stop 164, Figure 9, later described, so that in a further step-by-step movement of the main carriage alone, the ledger sheet traverses the group of punches 132 for punching the digits one at a time. When the sub-carriage is in its arrested position, the aforesaid ends of levers 134 are above the typing point and are therefore engageable by the type bar strikers 135. When the highest wheel registers "9," the case shift mechanism is operated, and concomitantly, by means, not shown, an extra punch 138 is operated to punch an extra hole c, see bottom line of Figure 5 code, in the ledger sheet before the amount perforations are punched to indicate that the amount perforations represent an overdraft.

After the new balance 97 43 has been typed and punched on the ledger sheet, the latter may be withdrawn from the machine. Before the sheet is withdrawn, it is punched with a sheet locating hole 139, Figure 2, by operating a punch 147 disposed a line space distance below the locating pin 117 and represented diagrammatically at Figure 8. Places in the balance punching column corresponding to denominational orders to the left of the first significant figure place are not punched, but are left blank, except where an overdraft-representing hole c is punched in the place corresponding to the highest of the nine computing wheels. Thus, regarding the positive new balance 97 43, Figure 2, the digits 9, 7, 4, 3, will be punched and the five places to the left of the first digit 9 will be left blank.

*Sensing mechanism*

A group of five sensing pins 140 and an extra pin 141, Figure 3, is mounted in sub-carriage 130 a line space distance above the punch group 132, 138. When a sensing pin 140 or 141 enters a corresponding hole in the ledger sheet, a corresponding spring-pressed contact finger 142, Figures 1, 8 and 16, which bears upon and presses the pin makes contact with a corresponding one of individually insulated contact bars 143 mounted on platen frame 52. At the same time, a contact finger 144 will be in contact with a common contact bar 145. All fingers 142, 144 are electrically connected by a support 146 mounted on but electrically insulated from sub-carriage 130. Column unit 90, for the old balance column, mounts a group of contact bars 143ª, 145ª corresponding to and connected by wires 148 to contact bars 143, 145. While the carriage is in the old balance column zone, which is the sensing or ledger-sheet-reading zone, the group of contact bars 143ª, 145ª engages a group of corresponding contacts 143ᵇ, 145ᵇ mounted on the machine framework. Each of the six contacts 143ᵇ is connected by a wire 149 to a corresponding one of six relay magnets c', 1', 2', 3', 4' and 5' corresponding to sensing pins 141, 140. In Figures 16, the relay magnet designations c', 1'—5' are repeated and underscored adjacent the corresponding sensing pins and the contact bars. Common contact bar 145ᵇ is connected by a wire 150 to the minus side of a current rectifier 151 in the secondary circuit of a transformer 152 connectible to an alternating current supply. The plus side of rectifier 151 has a wire 154 connected to one lead of a magnet C whose other lead is connected to a connection 155 common to the six relay magnets c', 1'—5'.

Entry of two sensing pins into the two holes representing a digit selects and causes energization of the corresponding two of the relay magnets 1'—5' to close the corresponding two contact devices E to select and energize one of the ten numeral type action magnets M. When one of magnets M is energized, its armature 157, Figure 1, rocks a corresponding lever 158 to lift the corresponding draw link 33 to engage snatch roll 38 whereby the corresponding type action is operated to print the digit and index it in the carriage-selected computing wheel driver 71 corresponding to the denominational order of the sensed digit. The Figure 5 code shows which two of the relay magnets 1'—5' are energized to select and energize each of the magnets M, numbered 1–9, 0, Figure 16; these M magnet numbers are repeated, but underscored, at leads 159 going to the magnets M.

When the two perforations for the digit 1, for example, are sensed, the two relay magnets 2' and 4' are energized to close their respective contact devices E to close a circuit for the "1" magnet M. This circuit is: plus lead 154 from rectifier 151, branch b to one of the two poles p of the closed contact device E of magnet 2', lead f to one of the four poles p of the closed contact device E for magnet 4', the lead 159 marked l, "1" magnet M, lead 162, and lead 150 to the minus side of rectifier 151.

A switch 165, in the transformer primary circuit, is opened under control of the letter feed mechanism to deenergize the magnets before the carriage step which attends operation of the type action gets under way. Switch 165 is also reclosed under control of the letter feed mechanism at the end of the carriage step. As the carriage moves a step, the accompanying work sheet movement cams the sensing pins out of the sensed holes to disengage their respective fingers 142 and contact bars 143.

Switch 165 has a casing 165b secured to the right side of a housing 166 for cam plates 85. Switch 165, illustrated diagrammatically, may include a snap device, not illustrated, whereby a small inward movement, of about one-thousandth of an inch, of a plunger 165c projecting from casing 165b closes the switch with a snap, and whereby, conversely, release of the plunger results in a similarly small outward movement thereof and a snap opening of the switch. A control lever 167 for plunger 165c is a resilient strip fastened at its lower end to casing 165b. A rod 168 loosely fits in the upper end of lever 167 and has a sleeve 168a for shoulder connection with said lever.

Rod 168 links lever 167 to an arm 169 fixed to a rock shaft 170, Figures 11–13, journaled in the framework. An arm 171 fixed to shaft 170 is engageable by an arm 172 of a lever fulcrumed on pivot 63 of escapement stepping dog 61 and having an arm 173 bent horizontally for engagement with the edge of dog 61. Normally, dog 61 stops against an abutment 64a of dog rocker 64 and, in turn, stops a tooth of escapement wheel 59 to hold the carriage in a letter space position. In its normal position, Figure 11, dog 61 bears on arm 173 of the lever which, in turn, bears with its other arm 172 on arm 171 of shaft 170 to hold the latter in position wherein arm 169 and rod 168, with its sleeve 168a, press switch lever 167 to keep switch plunger 165c in closed-switch position.

In the usual letter space operation, dog rocker 64 is first rocked counterclockwise to the Figure 12 position to withdraw stepping dogs 61 from its engagement with the escapement wheel tooth, and interpose the holding dog 60 to hold the escapement wheel and carriage. Urged by its spring 174, the withdrawn dog 61 swings clockwise about pivot 63 to a stop 175 on the framework, Figure 12, to position dog 61 for the next escapement wheel tooth. This clockwise movement of dog 61 is attended by corresponding movement of the train, comprising 173, 172, 171, 170, 169 and 168, to release switch lever 167 and switch plunger 165c for consequent automatic snap-opening of the switch 165. A spring 176 urges said train to switch-opening position. By return rocking of dog rocker 64, the holding dog 60 is withdrawn from the escapement wheel, and the stepping dog 61 is placed before the aforesaid next tooth. In the ensuing step movement of the carriage by its spring motor 56, the escapement wheel 59 is turned clockwise, Figure 11, and rocks dog 61 counterclockwise back to abutment 64a which limits the carriage step. This counterclockwise rocking of dog 61 operates the aforesaid train to operate switch lever 167 to press the switch plunger 165c so that switch 165 will be closed at the end of the letter-feed step of the carriage. The movement of rod 168 derived from dog 61 may be in excess of the required movement of switch lever 167; this conduces to effecting the closing of the switch at the latter part of the carriage step movement.

Switch 165 is also opened and reclosed in correlation with tabulating the carriage. Upon lifting said rack 57 from engagement with the escapement pinion 58 to release the carriage for tabulating movement, said pinion 58 and escapement wheel 59 become free to rotate; and hence, stepping dog 61, which is in engagement with wheel 59 becomes free to turn clockwise to stop 175, Figure 13, under the urge of spring 174, and thereby cause opening of the switch 165. When rack 57 is re-engaged with pinion 58 at the end of the carriage tabulating movement, the carriage, under the urge of its spring motor 56, turns pinion 58 and escapement wheel 59 clockwise and thereby stepping dog 61 is turned counterclockwise back to stop abutment 64a and thereby causes reclosing of switch 165.

Reference may be had to my aforesaid copending application, Serial No. 419,889, for a more detailed description of the punching and sensing mechanism. Patent No. 2,192,365 to H. L. Pitman, dated March 5, 1940, may also be referred to for a more detailed description of the features relating to automatic total printing under control of the total key and totalizer. The foregoing concise preliminary description is sufficient for an understanding of application of the present invention which will now be described.

*Automatic control of carriage movement to position ledger sheet for sensing first significant digit punching*

The ledger sheet having the first line of entry, Figure 2, has been reinserted in the machine and has been line positioned by placing the first-line hole 139 over pin 117 so that the perforations representing the balance 97 43 will be in line with the group of sensing pins 140, 141. The carriage has also been returned fully to a position at least one letter space to the right of the position, for the old balance column, corresponding to the highest of the nine computing wheels.

A balance key 177 is now operated for resulting advance, as will be described presently, of the carriage and ledger sheet to said highest wheel position and for rendering certain devices effective for enabling further carriage advance to the first significant-digit position to proceed automatically.

The sub-carriage 130 carrying the sensing pins 140, 141 will also be advanced with the carriage and ledger sheet to said highest wheel position. By this advance of the sub-carriage, an edge 160 of a lever 161 thereon will have been brought against a normally latched stop 164 on the typewriter framework, Figure 9, so that at later further advance of the carriage and ledger sheet from said highest wheel position, the sub-carriage and its group of sensing pins are held stationary to enable the ledger sheet to traverse the sensing pin group. Lever 161 is fixed to a vertical shaft 163 journaled in the sub-carriage. A frame 137, Figures 1 and 8, mounting the sensing pins 140, 141 and the support 146 for contact fingers 142, 144 is also fixed to said shaft 163. Before stop edge 160 of lever 161 reaches stop 164, the latter bears against a cam edge 160a of said lever during advance of the carriage and sub-carriage so that lever 161, frame 137, shaft 163, and support 146 are turned as a unit to bring the sensing pins to bear upon the ledger sheet and to permit contact fingers 142, 144 to engage the contact bars 143, 145 under control of the sensing pins. Before said unit is thus turned, it is held in retracted position by means of a spring and stop, not shown; and in such retracted position, the sensing pins are also retracted from the ledger sheet by frame 137 and keep the contact fingers 142, 144 from engaging bars 143, 145 all as more fully described in my said copending application Serial No. 419,889.

Key 177 is on an arm 178, Figures 4 and 6, fixed to a rock shaft 179 journaled in the framework. A spring 180 normally holds arm 178 against a stop 181. Another arm 182 fixed to shaft 179 has a one-way operating connection 183 to a tabulating key lever 184 operable to lift a reed 185 into the path of a stop 186 on column unit 90 for the balance column. Key lever 184 and its reed 185 may be elements of a denominational tabulating mechanism, such as shown in Helmond Patent 1,858,447. An arm 189 fixed to shaft 179 is connected to a pull rod 190 guided at 191 and having electrically insulated operative connection 192 with one of two contact blades 193 connected, for joint movement, by an insulator 194. Each blade 193 and a pair of companion contact blades 195 form one of two two-way switches designated as F and R in the circuit diagram, Figure 16. The switch blades 193, 195 are mounted on the typewriter frame as at 196, Figure 4, and are insulated from each other and from the frame. It will be seen now that depression of balance key 177 operates to raise reed 185 to release the carriage by lifting rack 57 from escapement pinion 58, by means of levers 124 and 125, Figure 1, and to throw the two-way switches F and R from the full-line to the dotted-line positions, Figure 16.

The released carriage is advanced by spring motor 56 until arrested by means of the lifted reed 185 and stop 186. The depressed balance key 177 is now released, thereby causing retraction of reed 185, by a spring not shown, restoration of the switches F and R to the full-line position, Figure 16, and restoration of carriage rack 57 to escapement pinion 58. Upon said restoration of said rack 57, the carriage advances slightly farther to settle at the highest computing wheel position. This slightly farther advance of the carriage is in accordance with the stepping dog 61 being swung back, from the Figure 12 position, to abutment 64ª, Figure 11, by clockwise rotation of pinion 58 and escapement wheel 59 under the urge of carriage-spring-motor 56.

Throw of the balance key switches F and R to the dotted-line position, Figure 16, is completed by a first portion of the pressing stroke on balance key 177 to make a circuit to energize a magnet Q to attract its armature 197, Figures 7 and 16, from a normal position in which it is held by a spring 198 against a stop 199.

Said circuit, Figure 16, for magnet Q is as follows: plus lead 154 from rectifier 151 to switch R thrown to the dotted-line position, lead 200, magnet Q lead 201 to switch F thrown to the dotted-line position, resistor 202, lead 203 and lead 150 to the minus side of the rectifier 151.

Armature 197 normally latches an armature 204 of a magnet C, and attraction of armature 197 by magnet Q releases armature 204 for consequent movement, by a spring 205, to close a switch S' comprising two normally separated contact blades 206 one of which is operatively connected to armature 204 as in Figure 7. The closing of switch S' makes a circiut for a spacing relay magnet S which is energizable to attract its armature 207 to close its relay switch SP' normally held open by armature spring 208.

Said circuit, Figure 16, for magnet S is as follows: plus lead 154 from rectifier 151, closed switch S', relay magnet S and lead 150 to the minus side of rectifier 151.

The current supply, magnet and relay apparatus may be mounted on a board 235 as a unitary assembly, Figure 7. Said board 235, partly shown in Figure 1, may be disposed at the rear of the computing base B and supported by the framework.

The energizing of magnet Q during the first part of the depressing stroke of balance key 177 is immediately followed by opening of the universal escapement switch 165 which occurs during the remaining part of said balance key stroke inasmuch as the timing may be so arranged that it is during this remaining part of the stroke that the carriage-releasing lift of the rack 57 results in spring-urged movement of dog 61 to the Figure 13 position to cause the switch 165 to open. Thus, the opening of switch 165 and the closing of switch S' may be substantially coincidental. However, even if the closing of switch S' should be slightly earlier than the opening of switch 165, the magnet S will fail to close the switch SP' since magnet S has a retarding coil or slug 209, so that it lags in reaching effective magnetic energization. The contact gap of switch SP' and spring 208 may also be regulated to affect timing of the closure of said switch SP'. In any event, magnet S may effectively operate to close switch SP' only at about the time the carriage settles into the highest wheel position following depression and release of the balance key 177, the effective operation of magnet S being dependent on and being finally caused by the reclosing of universal switch 165 which attends the settling of the carriage at said highest wheel position. The effective operation of magnet S is also dependent on the ledger sheet place, corresponding to the place at which the carriage settles, being not perforated for a significant digit.

If the place on the ledger sheet corresponding to the highest computing wheel place at which the carriage has settled is not perforated, as will be the case with reference to the perforated positive balance 97 43, the closing of switch SP', by effective operation of magnet S, will make a circuit to energize a spacer magnet SP.

Said circuit, Figure 16, of spacer magnet SP is as follows: plus lead 154 from rectifier 151, closed switch S', lead 222, closed switch SP', lead 211 to switch R', hereinafter described, closed at its full line position, lead 212, spacer magnet SP, lead 162, and lead 150 to the minus side of rectifier 151.

Spacer magnet SP is disposed in a row, with the type action magnets M, on the typewriter frame, Figure 1, and operates through its armature 157 and a lever 158 to move a spacer draw link 210, pivoted to a lever 213, Figures 1 and 14, into engagement with snatch roll 38. Lever 213, fulcrumed at 46, has a cam 214 engaging arm 215 fixed to a rock shaft 216 journaled in the typewriter framework and having an operating connection 217 to a rocker frame 230 connected to a rearward extension of universal bar 62, whereby rearward stroke of draw link 210 by snatch roll 38, resulting from operation of spacer magnet SP, rocks dog rocker 64 clockwise of Figure 1 to permit the stepping dog 61 to escape from the escapement wheel 59 and interpose the holding dog 60. As the stepping dog 61 escapes and turns on its pivot, the universal switch 165 becomes opened as hereinbefore explained. This opening of switch 165 causes deenergization of the magnets consonantly with return of the parts, except switch S', to normal position. Preparatory to return of the parts, including dog rocker 64, the draw link 210 encounters knock-off 49 and thereby becomes disconnected from snatch roll 38 to permit said return. As the dog rocker 64 returns to normal position, the holding dog 60 is withdrawn and the stepping dog 61 is interposed before the next tooth of the escapement wheel. In the resulting letter feed step of the carriage, the stepping dog 61 becomes returned to the dog rocker abutment 64ª and coincidentally switch 165 becomes reclosed as the carriage reaches the end of the letter space step.

Said step of the carriage has brought the next place on the ledger sheet into position opposite the group of sensing pins. The punched balance under consideration being 97 43, said next ledger sheet place is still ahead of the first significant figure "9" and is, therefore, an unperforated place. Nothing has occurred so far to reopen switch S'. The deenergization of magnet Q resulting from the opening of universal switch 165 has merely released its armature 197 to become positioned by its spring 198 idly against the end of armature 204 of magnet C without affecting the closed switch S'. Therefore, with switch S' still closed, the reclosing of universal switch 165, as the carriage reaches the end of said step, will again cause energization of spacer magnet SP so that a further letter space step of the carriage, without printing, results to bring the next place of the ledger sheet opposite the sensing pins.

In this manner, the carriage is automatically moved step-by-step, including the last step which brings the two perforations representing the first significant figure "9" of the perforated balance 97 43 opposite the corresponding two spring-pressed sensing pins 140 which enter these two perforations and the corresponding contact fingers 142 contact their bars 143 for resulting operation of the relay magnets 3' and 4' to make a circuit for the magnet M for the "9" type action to cause operation of the latter to print "9" and index "9" in the computing wheel driver 71.

Magnet C is in series with the group of relay magnets c', 1'—5', so that when current flows through any of these relay magnets, as through the relay magnets 3', 4' now considered, current will also flow through and energize magnet C. The energized magnet C attracts its armature 204 to open switch S' and release armature 197 so that the latter urged by its spring 198, passes behind and latches armature 204 to keep switch S' open. The energization of magnets 3', 4' and C is, of course, dependent on the closing of universal switch 165 which occurs as the carriage reaches the end of the last spacing step which brings the first significant digit "9" perforations to sensing position. This closing of switch 165 will provide current to magnet S, at the same time that it provides current to magnet C. But, as hereinbefore described, magnet S is a slow-action magnet as compared with magnet C. Therefore, magnet C will first operate to open switch S' to break the circuit to magnet S before the latter can become sufficiently energized to close its spacer relay contacts SP'.

It will be apparent now, that the sensing of the first significant digit perforation "9" automatically results in terminating the automatic carriage spacing, without printing, by causing opening of switch S', and that the sensing of any other first significant digit perforations similarly would have terminated the automatic carriage spacing. By the carriage step which attends the operation of the "9" type action, the next perforation place, for the digit "7", is brought opposite the sensing pins and it results that the "7" type action becomes operated to print and index "7." Similarly, the digits "4" and "3" are caused to be typed and indexed in turn. A known skip-space device, not shown, may be associated with the carriage rack 57 to cause a carriage advance equal to two steps and thereby automatically produce a punctuation space on the ledger sheet after typing in the units-of-dollars place. The skip-space device may be similar to that shown in Kupetz Patent 1,680,526.

In the letter-space step of the carriage which attends the typing of the units-of-cents digit "3," the cycle trip tappet 105 actuates the cycle trip lever 106 to initiate a cycle whereby the computing wheel drivers are actuated so that the indexed old balance 97 43 is accumulated in the totalizer.

If no significant figure digit perforation is sensed, the automatic carriage-spacing operation, initiated by operation of the balance key 177, will proceed throughout the old balance zone but will be terminated automatically under control of the carriage as the latter automatically takes the letter-spacing step which corresponds to the step which would attend the sensing and typing of the lowest, units-of-cents, digit. As the carriage takes such step and actuates the cycle trip lever 106 to displace the dog 102 to initiate a cycle, an arm 217, Figure 4, fixed to said dog 102, engages and closes a normally open switch 218 mounted on the side of housing 166.

Closing of the cycle switch 218, makes the following circuit, Figure 16, to cause energization of magnet C: Plus lead 154 from rectifier 151, magnet C, lead 219 to balance key switch R standing closed at its full-line position, lead 220, closed cycle switch 218, resistor 221 which has about the same resistance as any one of the relay magnets c', 1'—5', lead 203, and lead 150 to minus side of rectifier 151.

When magnet C is caused to be energized by closing of cycle switch 218 during said carriage step from the lowest order of a balance column zone, its armature 204 is attracted to open switch S' and also release armature 197 which thereupon passes behind and latches armature 204 to keep switch S' open. The opening of switch S', in this manner, automatically terminates the automatic carriage-spacing operation at the end of the old balance zone. With the cycle switch 218 being closed during the letter-space step of the carriage from the lowest order of the old balance zone, and with the universal switch 165 also being closed at the end of such step, current will be directed to both the magnet C and spacing relay magnet S. But the magnet C will, nevertheless, operate to open switch S' before magnet S, which, it will be remembered, is a slow-action magnet, can close the switch SP' to cause another carriage-spacing step.

Following the sensing, typing, and entry in the totalizer of the balance 97 43, typing may proceed in the descriptive columns. Then a negative entry of 206 79, referring to the second line of the ledger sheet, Figure 2, is typed in the credit column, and concomitantly, is indexed in the drivers for said totalizer. The credit column unit 90 has a tappet to depress subtraction plate 115, Figure 1, to predetermine subtraction of the credit entry from the totalizer when the machine is cycled following the typing and indexing of the credit entry. The subtraction of the entry 206 79 from the old balance 97 43, previously added in the totalizer, results in the nine totalizer wheels 70 standing at 9999890 63 which is the nines complement of the true overdraft or credit balance 109 36, the totalizer having a device, not shown, to automatically account for the fugitive one.

*Typing, indexing, and punching a negative total*

The total key 122 is now operated to position the carriage at the place for the old balance zone corresponding to the highest one of said nine wheels. As the carriage settles at said place, it depresses the cam plate 85 for said totalizer, said cam plate having been tilted rearwardly by operation of total key 122. This depression of cam plate 85 predetermines control of the drivers 71 for said totalizer by the jacks 78 and also releases the set of total readers 128 for said totalizer. The released reader 128 for the highest wheel 70 assumes a position against a "9" overdraft stop 137, Figure 1, since the wheel stands at the "9" position. At the same time, the driver 71 for said wheel will have been slightly advanced to pin-setting position under control of the jack 78 operated by the carriage at the highest wheel position. Means, not shown, provide that this slight advance of the highest driver 71 is also dependent on the total key 122 having first been operated; otherwise, depression of said highest jack 78 does not affect slight advance of the highest driver 71. This slight advance of the highest driver 71 operates through intermediate means, not shown, to raise the finger 223, Figure 14, pivoted on the reader 128 and positioned, by the highest wheel "9" positioning of said reader, under one of the eleven blades 224 so that this blade is raised to rock a lever 225, fulcrumed on the framework, counterclockwise. The other ten blades 224 represent the digits from 0 to 9 and are selected under control of corresponding stops 137 on any wheel, except that the highest wheel at its "9" overdraft position selects said one blade.

A case-shift draw link 226, Figure 14, has fulcrum supports 227 which also permit said draw link to move endwise. A forward extension 228 of draw link 226 normally underlies a stud 229 on lever 225, so that when the latter is rocked counterclockwise under control of the highest wheel 70 and its driver 71, the draw link 226 is rocked clockwise to raise its rear toothed rack portions into engagement with snatch roll 38 for a resulting endwise rearward stroke of said draw link. This stroke is transmitted, by a lever 231 and link 232, to and rocks the case-shift frame 65, 66 to lift the platen frame 52 to upper-case position. A latch 233 on frame 65, 66 automatically engages a stop 234 to maintain said frame in upper-case position after draw link 226 becomes disengaged from the snatch roll by encountering knock-off 49 just before the case shift is completed.

A plate 236, Figure 14, connected to lever 231 is displaced forwardly at the shift to upper case. The earlier counterclockwise rotation of lever 225 has drawn downwardly a lever 238 to place a stud 239 thereon opposite a nose 240 on plate 236 so that the forward displacemet of the plate rocks said lever 238 clockwise about its pivot on lever 225. Lever 238 has a pin-and-slot connection 241 to a bail 242 so that the rocking of lever 238, at the shift to upper case, lifts said bail by turning it clockwise about the axis of a supporting shaft 243 mounted by the framework. In Figure 14, lever 238 and bail 242 are shown separated for clear illustration but are normally joined by the connection 241 which permits the vertical movement of lever 238 by lever 225.

A bar 244, Figure 14, slidably supported for endwise movement, on the "9" type action lever 41, is normally positioned so that a pin 245 thereon engages in a slot 246 of the intermediate bell crank 43 of the "9" type action, whereby operation of said lever 41 normally operates the "9" type bar 39. Bar 244 has a link-and-arm connection 247 to bail 242 so that the lift of the latter to upper-case condition, preparatory to negative total printing, withdraws pin 245 from slot 246 to effect disconnection of the "9" type bar from its lever 41. A detent device 248 yieldably maintains bail 242 either in lifted position or in normal position.

A rod 249 operatively connected to bail 242 is thrust downwardly, when said bail is lifted, to engage a stud 250 on a forward extension of the "9" type action draw link 33 and thereby move the latter into engagement with snatch roll 38 for resulting operation of the "9" type action lever 41, without printing, said lever 41 becoming at this time also disconnected from its type bar 39.

The operation of the "9" type action lever 41, without printing, works through its rod 76 and linkage 73, 74 to set the "9" pin in the slightly advanced, highest driver 71. The operation of said lever 41 also operates through a connection 252, Figures 1 and 14, to rock shaft 216 to rock frame 230, and, therefore, rock escapement dog rocker 64 to initiate a letter-feed step of the carriage. When the "9" type action draw link 33 finally encounters knock-off 49, Figure 1, and becomes disconnected from snatch roll 38, lever 41 returns to normal position and dog rocker 64 also returns for completion of the letter-feed step of the carriage. Lever 41 remains disconnected from its type bar since bail 242 is, at this time, maintained, by detent 248, in its lifted position.

By said letter-feed step, the carriage is placed at the position corresponding to the second highest computing wheel, which, in the example under consideration, also stands at "9." At said second place, the carriage will have advanced the second driver 71 to pin-setting position so that the latter is effective to raise the "9" blade 224 as determined by the reader 128 associated with the second highest wheel. This lift of "9" blade 224 results in operating the corresponding lever 129 to connect the "9" type action draw link 33 to the snatch roll for another operation of the "9" lever 41, without printing, to index "9" in the second register bar and cause an actuation of the escapement mechanism to space the carriage to the next place.

At this place of the carriage, corresponding to the third highest wheel 70, the "9" lever 41 will again be selected and operated, without printing, to index "9" and cause a letter-feed step of the carriage to the next place. In this manner, the carriage is automatically advanced step by step for each wheel that registers an insignificant "9" and the driver 71 for each such wheel has its "9" pin set.

When the carriage reaches the place corresponding to the wheel showing the first significant digit, which in the present instance is "8" (the nines complement of "1") the "8" type action will be selected and automatically operated to set the "8" pin in the driver for said first significant figure wheel. But since the platen frame 52, is still in upper-case position, actuation of the "8" type action prints the digit "1" by its upper-case type, see "type" column of Figure 5.

When any type action is operated to print a first significant figure of a credit balance, its lever 31 engages and restores bail 242 downwardly thereby shifting bar 244 rearwardly to reconnect the "9" type bar to its lever 41. Thereafter, selection and operation of a type action proceeds for each wheel 70 after the first significant digit wheel, and the operation of each such type action indexes the corresponding driver 71 with the digit standing in the wheel but prints the nines complement of said digit by means of the upper-case type.

It will be seen now that the nines complement of the true overdraft in the present example: namely, 9999890 63, will be indexed in the drivers, but the true overdraft 109 36 will be printed on the ledger sheet in the balance column.

Concomitantly with the typing of the digits of the true overdraft, the complements thereof as registered in the totalizer, will be punched on the ledger sheet so that, in the present example, the significant complement digits 890 63 will be punched. The insignificant "9's" standing in the computing wheels to the left of the first significant complement digit "8" are not punched in the ledger sheet.

In order to indicate that a negative or complemental amount has been punched, the extra hole c, according to the Figure 5 code, will have been punched in the ledger sheet concomitantly with the operation of the case-shift effected under control of the highest wheel. The extra hole c will be in the place, in the ledger sheet perforation zone, corresponding to said highest wheel, see Figure 2.

After typing the last overdraft digit "6" and concomitantly punching and indexing its complement "3," the machine is cycled to subtract the indexed complement 9999890 63 from, and thereby clear, the totalizer. While the ledger sheet is still in position in the machine for the second-line entry, punch 147 is operated to punch the second-line sheet-locating hole 139 one line space below the sheet-locating pin 117. The second line entry operations having been completed, the ledger sheet may be removed from the machine.

The mechanism and operation described in this section entitled "Typing, indexing, and punching a negative total," are substantially as disclosed in my aforesaid copending application Serial No. 419,889.

Preparatory to making the third line of entry, the sheet is relocated in the machine by placing the second-line hole 139 over locating pin 117 whereby the second-line perforations will be in line with the group of sensing pins 140, 141. The carriage will also be in a position at least one letter space to the right of the position, for the old balance column, corresponding to the highest computing wheel.

*Automatic control of carriage movement to position the ledger sheet for sensing the first significant digit perforation of an overdraft*

Balance key 177 is now operated for resulting advance of the carriage 52, 53, together with sub-carriage 130, to said highest computing wheel position where said sub-carriage will just be in a position to be arrested by means of stop 164 when presently there is further advance of the main carriage 52, 53.

The first portion of the down stroke of balance key 177 has caused switch F, R to close to the dotted-line position, Figure 16, thereby causing magnet Q to be energized to release armature 204 for consequent spring-urged closing of switch S'. Universal switch 165 is opened with the clockwise rotation, Figure 12, of escapement dog 61 occasioned during the latter portion of the down stroke of balance key 177 when carriage rack 57 has been lifted from escapement pinion 58 to release the carriage 52, 53 for consequent advance to stop reed 185, which has been lifted to carriage-arresting position by the down stroke of said balance key 177. At the return of balance key 177 and reed 185, carriage rack 57 becomes restored to escapement pinion 58 for resulting rotation of the latter and of the escapement wheel 59 and attendant rotation of escapement dog 61 back to abutment 64ª as the carriage settles at the highest computing wheel position in respect to the old balance zone.

The group of sensing pins 140, 141, in reaching this highest wheel position, along with carriage 52, 53 and sub-carriage 130, is released for bearing upon the ledger sheet as a result of the action of cam edge 160ª of lever 161 against stop 164. It results when the carriage has become settled at said position that the credit balance sensing pin 141 will have entered the credit balance perforation c present in the ledger sheet at the place corresponding to said position, and universal switch 165 will also have become reclosed by the described return of escapement dog 61 to abutment 64ª.

This sensing of the credit balance hole c results in making the following circuit, Figures 14 and 16, for the credit balance relay magnet c': plus lead 154 from rectifier 151, magnet C, credit balance relay magnet c', lead 149, carriage closed contacts 143ª, 143ᵇ, wire 148, contact finger and bar 142, 143 corresponding to magnet c' and closed in contact because of the entry of pin 141 in hole c, support 146, the contacting common finger 144 and bar 145 and corresponding wire 148 to carriage closed contacts 145ª, 145ᵇ, and lead 150 to rectifier 151.

The resulting energization of magnet c' closes its single pole contact device E to make a circuit for a case-shift magnet SH which is disposed in the row with the type action magnets M and spacer magnet SP.

This circuit, Figure 16, for case-shift magnet SH is as follows: plus lead 154 from rectifier 151, branch a, closed contact device E, lead 256, switch F" closed in the full-line position, Figure 16, lead 257, magnet SH, lead 162, and lead 150 to the minus side of rectifier 151.

Switch F' and the previously-referred-to switch R' are similar to the balance key switches F and R and are mounted on the side of cam plate housing 166, Figure 4. A pull rod 258 connected to the case-shift rail frame 65, 66 is guided at 259 and has electrically insulated operative connection 260 with one of the two movable blades 261 of said switches F', R'. Said blades 261 are connected by an insulator 262 for joint movement.

Case-shift magnet SH, when energized, operates through its armature and lever 158, Figure 14, to rock clockwise a lever 263 fulcrumed on the framework and overlying and engaging stud 229 of lever 225 whereby the latter is rocked counterclockwise to rock case-shift draw link 226 into engagement with snatch roll 38. This operation of lever 225 also operatively connects lever 238, and hence bail 242, with plate 236. The case-shift draw link 223 having thus become connected to snatch roll 38 in response to sensing of the credit balance hole c, it results that case-shift frame 65, 66 is shifted counterclockwise to the Figure 14 position to lift platen frame 52 to upper-case position. Latch 233 thereupon engages stop 234 to maintain this case shift after draw link 223 becomes disengaged from snatch roll 38 by means of knock-off 49, Figure 1. This case-shift operation also lifts bail 242 to effect disconnection of the "9" type bar 39 from its lever 41. This lift of bail 242 also operates, through rod 249, to engage the "9" draw link 33 with snatch roll 38 for a resulting operation of said lever 41, without printing. By this shift to upper-case position, the frame 65, 66 will have operated through pull rod 253 to shift the switches F', R' from the full-line position to the dotted-line position, Figure 16, corresponding to the full-line position, Figure 14.

The shift of switch F' to this position breaks the circuit to case-shift magnet SH, which has done its work, and makes, as will be described later, a circuit to a "9" pin-setting magnet 9P.

The shift of switch R' to this position cuts the spacer magnet SP out of control of the spacer relay magnet S and its relay switch SP', and instead, cuts in the "9" type action magnet M for control by said magnet S and its switch SP'.

Magnet C being in series with credit balance relay magnet c', current flows through both of these magnets as a result of the credit balance sensing pin 141 being entered in the credit balance perforation c, and the attendant energization of magnet C attracts its armature 204 to open switch S' so that the spacer relay magnet S and its switch SP' are inoperative at this time to cause an operation of the "9" type action magnet M; even though, as just described, the latter has been cut in by the shift of switch R' to the Figure 16 dotted-line position.

Magnet Q will be energized to keep its armature 197 attracted while the carriage is at the position in which the credit balance hole c is being sensed so that switch S' may reclose again when magnet C becomes deenergized by the opening of universal switch 165 as the carriage steps to the next position as a result of the operation of "9" lever 41, without printing, at the shift to upper case.

The circuit, Figures 14 and 16, under control of sensing of the credit balance hole c, whereby magnet Q is caused to be energized is as follows: plus lead 154 from rectifier 151, magnet C, lead 219, balance key switch R closed in full-line position, lead 220, magnet Q, lead 231, balance key switch F closed in full-line position, lead 265, lead 149 to carriage contacts 143ª, 143ᵇ, wire 149 to contact bar 143 and finger 142 corresponding to the credit balance sensing pin 141, support 146, common contact finger 144 and bar 145, wire 148 to carriage contacts 145ª, 145ᵇ, and lead 150 to rectifier 151.

At the opening of universal switch 165 attending the step of the carriage from the credit balance hole c sensing position to the next position, and which step resulted from the operation of the "9" type action lever 41 without printing, the magnets c', C and Q are caused to be deenergized. Magnet Q, however, has a retarding coil or slug 267 to make its deenergization lag behind the deenergization of magnet C whereby the latter releases its armature 204 first to reclose switch S' before magnet Q can release its armature 197 to prevent the reclosing of switch S'.

When the carriage is in the credit balance hole sensing position, it alone is not effective to cause advance of the highest computing wheel driver 71 to pin-setting position since, as hereinbefore-mentioned, this advance is also dependent on the total key 122 having been operated. But there is no occasion for operating said total key 122 in respect to sensing the old balance in the ledger sheet. Therefore, operation of the "9" type action lever 41, without printing, and of the corresponding pin-setting bar 73 does not affect the necessary setting of a "9" pin in said highest computing wheel driver 71. But an extra "9" pin-setting train, Figure 15, operable under control of the aforesaid case-shift controlled magnet 9P is provided as follows: A dummy type action, included in the type action system, includes a lever 31ª, link 45ª, lever 41ª, bell crank 43ª, a dummy type bar 39ª, and rod 76ª. The dummy type bar 39ª has no type to print, nor is it effective to operate escapement universal bar 62. An extra pin-setting linkage 74ª, Figure 15, comprises a pin-setting bar 73ª having a lug 268 extending over the "9" pin 72 of the highest computing wheel driver. At the working stroke of the dummy type action, its rod 76ª rocks a companion shaft 75ª to operate said linkage 74ª, 73ª to set the "9" pin in the highest computing wheel driver.

When the case-shift switch F' is shifted to the dotted-line position, Figure 16, corresponding to the full-line position, Figure 15, as a result of the case shift attending the sensing of the credit balance hole c, the previously mentioned circuit is made for the magnet 9P.

Said circuit for magnet 9P is as follows: plus lead 154 from rectifier 151, branch a, contact device E closed by magnet c' as a result of sensing the credit balance hole c, lead 255, to switch F' closed in said full-line position, Figure 15, lead 239, magnet 9P, lead 152, and lead 150 to the minus side of rectifier 151.

Said magnet 9P is energized and thereupon operates through its armature 157 and lever 158 to connect a draw link 33ª, Figure 15, connected to dummy type action lever 31ª, to snatch roll 38. The resulting working stroke of the dummy type action and corresponding pin-setting bar 73ª sets the "9" pin in the highest computing wheel driver 71 without the latter having beeen advanced to pin-setting position. Near the end of the pin-setting stroke, the draw link 33ª becomes disconnected from snatch roll 38 by means of knock-off 49 preparatory to return of the parts to normal position. The dummy type bar 39ª and bell crank 43ª are provided to give the pin-setting train weight to complete the working stroke by momentum since the draw link 33ª may become disconnected from snatch roll 38 before full completion of said stroke.

The foregoing operations in respect to the sensing of a credit balance hole c may now be summarized as follows: The balance key 177 is first operated to cause the carriage 52, 53, the ledger sheet and the sub-carriage 138 to tabulate to the position, in the old balance zone, corresponding to the highest order computing wheel. At this position, the credit balance sensing pin 141 will have been entered in the credit balance hole c thereby causing magnets c', C, and Q to be energized. This energization of relay magnet c' closes its contact device E to make a circuit to the case-shift magnet SH by way of switch F' which is in full-line position, Figure 16, at this time because the case shift has not yet occurred.

It will be noted that with the switch R' closed in full-line position at this time because the case shift has not yet occurred, the space magnet SP will be in series with the open spacing relay contacts SP' associated with the spacing relay magnet S; but magnet S will not be energized at this time because the switch S' has been opened by the energized magnet C, and, therefore, no operation of the space magnet SP can occur when the credit balance hole is being sensed. The energization of magnet SH results in an operation of the case-shift mechanism for a shift to upper case. The shift to upper case shifts the switch R' to the dotted-line position, Figure 16, thereby cutting out the space magnet SP and, instead, putting the "9" type action magnet M in series with the spacer relay switch SP'. But said "9" type action magnet will not be caused to be operated at this time inasmuch as switch S' is still open. The shift of switch F' to dotted-line position, Figure 16, as a result of the case shift, cuts out the case-shift magnet SH and instead cuts the "9" pin magnet 9P into the circuit controlled by the sensing of the credit balance hole c. The magnet 9P will, therefore, be caused to be energized to set the "9" pin in the highest computing wheel driver 71. At about the same time, the shift to upper case has lifted the bail 242 to disconnect the "9" type bar from its lever 41 and to connect said lever 41 to snatch roll 33 for a resulting operation, without printing. This operation of "9" lever 41 works through the connection 252, rock shaft 216, and connection 217 to actuate dog rocker 64 for a resulting letter-feed step of the carriage and ledger sheet to the next position. Since the group of sensing pins is being held stationary, with the sub-carriage 138, during this step by means of stop 164, the credit balance hole c passes from the credit balance sensing pin 141. At the initiation of said step, the universal switch 165 is opened thereby deenergizing all the magnets.

However, at this deenergization of all the magnets, the deenergization of magnet Q lags, due to its retarding slug 267, and it results that its armature 197 is kept attracted long enough to permit switch S' to reclose at the earlier deenergization of magnet C. Therefore, switch S' will be in closed position as the carriage and ledger sheet reach the next letter-space position in said carriage step which follows the sensing of the credit balance hole c.

In the present example regarding the true over-draft 109 36, the ledger sheet, in said next letter-space position which is the second sensing position, will present no perforations to the group of sensing pins because only the significant digits of the complement of the true overdraft have been punched. But since switch S' will be in closed position at said next letter-space position and universal switch 165 will have been reclosed, the space relay magnet S will receive current by way of said closed switch S' and close its switch SP' to cause energization of the "9" type action magnet M. It results that the "9" lever 41 will be again operated, without printing, and concomitantly the corresponding pin-setting linkage 73, 74 will be operated to set the "9" pin 72 in the second computing wheel driver 71 which has been slightly advanced to pin-setting position by carriage operation of the second jack 73. This operation of "9" lever 41 operates through shaft 216 and connections 217, 252 to initiate a letter-feed step of the carriage and ledger sheet to the next position and open universal switch 165 to deenergize the magnets. At the completion of this next step, switch 165 will have been reclosed and switch S', being still closed, the "9" type action magnet M will be again energized to again cause operation of the "9" lever 41, without printing; since, by said next step, the ledger sheet again does not present perforations to the sensing pins.

In this manner, the carriage is advanced step by step automatically by means of "9" lever 41, without printing, including the last step which brings the two perforations of the complement "8" of the first significant figure of the true overdraft 109 36 to the sensing pins. The resulting sensing of these two perforations will cause energization of the corresponding relay magnets 3' and 5', see Figure 5 code, and closing of their contact devices E to cause energization of the "8" type action magnet M. At the resulting operation of the "8" type action, the "8" pin 72 will be set in the computing wheel driver 71 selected by the carriage at the first significant digit position. But said "8" type action will print its upper case "1" which is the true first significant digit because the shift to upper case is being maintained by latch 233.

By operation of a type action corresponding to any first significant figure complement, from "0" to "8," inclusive, the lifted bail 242 is depressed to its normal position and thereby reconnection of the "9" type bar 39 and bell crank 43 to the companion lever 41 is effected.

The letter-feed step which attends the operation of the "8" type action for the first significant figure brings the carriage and ledger sheet to the next letter-space position at which the punched complement "9" of the second true overdraft digit "0" will be sensed with resulting operation of the "9" type action to set the "9" pin 72 in the computing wheel driver 71 selected by the carriage at the second digit position. This operation of the "9" type action also prints "0" by its upper-case type since the case shift is still maintained in upper case and the "9" type bar has become reconnected to the companion lever 41.

It will be seen now from the way that operation of the "9" type action for the second place digit followed automatically the operation of the "8" type action for the first significant digit that, in the same way, the operations for sensing, typing and indexing for the remaining true overdraft digits 9 36 will automatically follow in order.

It results, finally, that only the true overdraft digits 109 36 have been typed on the ledger sheet in the old balance column, and the entire complement 9999890 63 has been indexed in the nine computing wheel drivers 71 for additive entry in the totalizer during the cycle which follows the operation for the last figure. During this cycle, the case-shift latch 233 will be tripped for resulting restoration of the case-shifted parts to normal lower-case positions.

In the further course of the third-line entry, the debit 653914 83 is typed in the debit column and added to the complement 9999890 63 in the totalizer as follows:

9999890 63
653914 83
        1 (fugitive 1)

0653805 47 new balance in totalizer

This new balance is positive and is the difference between said debit entry and the true negative balance 109 36.

The total key 122 is now operated so that this new balance will be printed in the balance column and punched in the punching column of the ledger sheet. In the following cycle of the general operator, this new balance, which will also have been indexed in the computing wheel drivers 71, will be subtracted to clear the totalizer. Before the ledger sheet is removed from the machine, the punch 147 will have been operated to punch the third-line locating hole 139.

For the fourth-line entry, the ledge sheet is located in the machine by placing said last hole 139 over pin 117, and the carriage will have been fully returned.

Operation of balance key 177 now causes the carriage and ledger sheet to be positioned at the place, in the old balance zone, corresponding to the highest computing wheel. This operation of balance key 177 has also caused the magnet Q to be energized to permit switch S' to close. When the carriage and ledge sheet settle at said highest wheel position, no perforation will be presented by the ledger sheet to the sensing pins since the balance under consideration is a positive balance, and, the switch S' being closed, magnet S will be energized to close its switch SP' to cause energization of space magnet SP to connect spacer draw link 210, Figure 14, to snatch roll 38 for a resulting letter-space step of the carriage to the next position.

At this next position, the first digit "6" of the positive balance 653805 47 will be sensed, thereby causing energization of the relay magnets 1' and 2', Figure 5, for resulting operation of the "6" type action. Magnet C, being in series with said relay magnets 1' and 2' is energized to open switch S' which becomes latched in open position by means of spring-pressed armature 197 to cut cut further carriage-spacing operation by way of spacer relay magnet S.

It will be seen now that when the perforated balance includes the highest of the maximum eight places of the perforation column, there will be a single automatic letter-space step of the carriage, without printing, following the operation of balance key 177, namely, the step from the position corresponding to the highest of the nine computing wheels to the position corresponding to the highest of said eight places of the perforation column.

The reason for having the carriage first step at the position corresponding to the highest computing wheel, following operation of balance key 177, is that the line of perforations on the ledger sheet may or may not include a credit balance hole c; and if said hole c is present, it will be sensed at said highest wheel position of the carriage.

The fourth-line entry on the ledger sheet, Figure 2, illustrates an eight-place true credit balance or overdraft of 129761 74 and corresponding line of perforations which include a credit balance hole c. Operation of balance key 177 preparatory to the entry of this balance in the fifth line of the old balance column results in placing the carriage and ledger sheet at the position corresponding to the highest computing wheel.

At this position, this credit balance hole c will be sensed with resulting operation of the case-shift mechanism to upper case, disconnection of the "9" type bar, closing of switch S', cutting in of the "9" type action magnet M for control by magnet S, operation of the dummy type action to set the "9" pin 72 in the highest computing wheel driver 71, and, finally, a letter-space step of the carriage to the next position. At this next position, the first punching "8" which is the complement of the first true digit "1" will be sensed, and, therefore, magnets 3' and 5' will be energized for resulting operation of the "8" type action to index "8" in the computing wheel driver but print the upper case "1." When relay magnets 3' and 5' are energized, magnet C, in series therewith, is also energized causing opening of switch S' and relatching thereof in open position by spring-pressed armature 197 of magnet Q which, at this time, is inactive. This opening of switch S' breaks the circuit for magnet S and thereby prevents operation of the "9" type action lever 41. Moreover, said lever 41 will have become reconnected to its bell crank 43 and type bar 39 since the operation of the "8" type action depresses bail 242.

After the described operations relating to the highest figure of an eight-place positive balance or an eight-place overdraft balance have been effected, the machine proceeds automatically according to the remaining seven figures of either eight-place balance in the same manner as previously described herein with reference to the lesser balances 97 43 or 109 36.

In a modification, Figures 17 and 19, the case shift operated switches F' and R' of Figure 16 may be omitted, the space magnet SP, instead of the "9" magnet may be used for spacing the carriage automatically to the first significant digit sensing position of a negative balance and magnet SP may also be omitted. The balance key 177 is operated to place the carriage at the highest wheel position where, the balance being negative, the credit balance hole c will be sensed to energize relay magnet c' and close its contact device E.

This makes the following circuit, Figure 19, for case shift magnet SH: plus lead 154 from rectifier 151, branch a, closed contact device E, lead 256, magnet SH, lead 162, and lead 150 to the minus side of rectifier 151.

The resulting case shift operation by magnet SH depresses bail 242 to disconnect the "9" type bar from its lever 41 and cause an operation of said lever 61 to effect a letter space step of the carriage to the next position. The operation of magnet SH has also caused an operation of the nine-pin-setting dummy type action; for this purpose, the lever 158, Figure 17, operated by magnet SH is fixed to a rock shaft 270 journaled in the framework and operates levers 263, 225 to connect draw link 266 of the case shift action to snatch roll 38. An arm 158a also fixed to shaft 270 is operated, when magnet SH is energized, to connect draw link 33a of the dummy type action to snatch roll 38. The pin setting bar 73a operated by the dummy type action has a ledge 271, Figure 17, to simultaneously preset the "9" pins 72 in all the nine drivers 71 of the totalizer, said drivers being at this time all in their normal retracted positions. Subsequent setting of any pin 72, from "0" to "8," for any first significant order of a negative balance automatically effects restoration of the preset "9" pin in that order by means operatively interconnecting the pins; such means, not shown, are exemplified in Thieme Patent No. 2,075,557. In this way, all insignificant nines will be indexed for any of the nine computing wheels higher than the wheel which is to receive the first significant digit of a negative balance. As the carriage is letter spaced a step to the second position following the sensing of credit balance hole c, the universal switch 185, having been first opened, is reclosed whereupon relay magnet S receives current by way of closed switch S' and closes switch SP' to actuate spacer magnet SP for a further letter space step of the carriage to the next position. In this manner, the space magnet SP serves to space the carriage to the first significant digit place of a negative balance. The sensing of the first significant digit results in opening switch S' to terminate the automatic carriage spacing for consequent figures as hereinbefore explained.

In another modification, using the case shift switches F' and R', the lug 268ᵃ of the extra pin setting bar 73ᵃ and the "9" pin 72 in the highest computing wheel driver 71 may be adapted as in Figure 18 so that the pin is still under the lug when the highest driver has been slightly advanced to pin setting position as a result of operating total key 122. Lug 268ᵃ is of such width as to serve for setting the "9" pin only in the highest driver 71. When switch F' is thrown to the dotted-line position at the case shift attending the reading of overdraft "9" in the highest wheel, a circuit is made to cause energization of the magnet 9P to operate the dummy type action to set the "9" pin in the highest driver 71. This circuit includes contacts 272 closed by the lift of blade 224 resulting from the reading of overdraft "9" in the highest wheel.

Said circuit, Figure 20, is as follows: plus lead 154, closed contacts 272, lead 274 to switch F' thrown to the dotted-line, upper-case position, lead 269, magnet 9P and leads 162, 150 to the minus side of rectifier 151. Since closing of contacts 272 by lift of blade 224 may also serve, at printing the total from the totalizer, to energize magnet SH at the full-line, lower-case position of switch F', the magnet SH may serve, instead of lever 225, to connect case shift draw link 226 to snatch roll 38. In such case, while said lever 225 still serves to control lever 233, the operative connection of its stud 229 to arm 228 draw link 226 may be omitted, and the operative connection of said lever 225 to blade 224 may also be omitted. In this modification, rod 249 associated with bail 242 may be omitted since its function of operating the "9" lever 41 for setting the "9" pin in the highest bar 71 at total printing in the balance column may be omitted because this "9" pin setting will be performed by operation of the aforesaid dummy type action under control of magnet 9P. Further, lever 41ᵃ of the dummy type action may have a connection, not shown, but similar to the connection 252 for the "9" lever 41 to shaft 216, Figure 14, for effecting an operation of the escapement to advance the carriage from the highest wheel position to the next position.

It will be seen now that the invention provides, among other advantages, for automatically advancing the ledger sheet relatively to a sensing device in respect to one or more blank places which may possibly precede the first significant digit place of a sensable balance; that requisite indexing of insignificant nines, for computing, automatically attends the automatic advance of the sheet in respect to one or more blank spaces preceding the first significant digit place of a negative balance; that the variant advance in respect to one or more blank places preceding either a positive or negative balance and the sensing of the balance may be effected in automatic sequence following a simple single key operation such as that of key 177; and that the enabling structure may be of a simple nature as exemplified by the simple magnets C, Q and S and associate devices.

Variations may be resorted to within the scope of the invention and portions of the improvements may be used without others.

What is claimed is:

1. In a business machine, the combination with a device to sense digit designations on a record, and a carriage, of an operable member, means responsive to operation of said member to advance the carriage to a starting position preceding a carriage position for a predetermined highest order in which a digit is ever sensably recorded, a carriage advance control device conditioned as a result of operation of said member, means operative under control of said conditioned control device to advance the carriage automatically from said starting position to the variant position where the first digit designation will be sensed, and means responsive to the sensing of the first digit designation to restore said conditioned control device to terminate such automatic advance of the carriage.

2. In a business machine for sensing an amount on a record sheet in the machine, the combination of a carriage, a tabulating mechanism operable to advance the carriage to a predetermined starting position, a carriage letter-feed mechanism, a carriage advance control device conditioned coincidentally with the operation of said tabulating mechanism, means operative under control of said conditioned device to operate said letter-feed mechanism automatically to advance the carriage from said starting position to a position corresponding to the first significant digit of the amount, a sensing device acting at said last-named position to sense the first significant digit, and means acting as a result of the sensing of said first digit to restore said conditioned device.

3. In a business machine for sensing an amount on a record sheet in the machine, the combination of a carriage, a carriage letter-feed mechanism, a control device conditionable to control advance of the carriage from a predetermined starting position, means operative under control of said conditioned device to operate said letter-feed mechanism automatically to advance the carriage from said starting position to a position corresponding to the first significant digit of the amount, a sensing device acting at said last-named position to sense the first significant digit, means acting as a result of the sensing of said first digit to restore said conditioned device, and means acting under control of the carriage to cause said conditioned device to be restored if the carriage by the automatic operation of said letter-feed mechanism passes from the amount zone without a digit having been sensed.

4. In a business machine, the combination with a digit-sensing device, and a carriage, of an operable member, means responsive to operation of said member to advance the carriage to a starting position preceding a carriage position corresponding to a predetermined highest order in which a digit is ever sensably recorded on a record in the machine, a carriage advance control device conditioned as a result of the operation of said member, means acting under control of said conditioned control device to advance the carriage automatically from said starting position to the variant position corresponding to the order at which the first significant digit is recorded, and means responsive to the consequent sensing of the first significant digit to terminate such automatic advance of the carriage.

5. In a business machine the combination with a digit-sensing device, and a carriage advanceable to a position to present to the sensing device the first significant digit of an amount which may be of one or more orders sensably recorded on a record, of an operable member, means responsive to operation of said member to advance the carriage to a starting position preceding a carriage position for a predetermined highest order in which a digit is ever recorded, a carriage advance control device conditioned as a result of the operation of said member, means acting under control of said conditioned control device to advance the carriage automatically from said starting position to the variant position where the first significant digit recorded will be sensed, and means responsive to the sensing of the first significant digit to terminate such automatic advance of the carriage.

6. In a business machine, the combination with a device for electrically sensing the digits of an amount on a record sheet in the machine, a carriage, and a letter-feed mechanism therefor, of a normally open circuit including electro-magnet means for controlling operation of said letter-feed mechanism, a switch closable to enable said circuit to cause automatic operation of said letter-feed mechanism to advance the carriage from a starting position to a position where the first digit will be sensed, and electro-magnet means responsive to said sensing of said digit to open said switch.

7. In a business machine, the combination with a carriage, and a letter-feed mechanism, including an actuating magnet, for said carriage, of a relay switch and magnet for controlling said actuating magnet, a normally open control switch closable to enable said relay magnet to operate to close its switch for resulting operation of the letter-feed actuating magnet, a tabulating mechanism operable to tabulate the carriage to a starting position and close said control switch for resulting advance of the carriage from said starting position by means of the letter-feed mechanism.

8. In a business machine, the combination with a device for electrically sensing the digits of an amount on a record sheet in the machine, a carriage and a letter-feed mechanism, including an actuating magnet, for said carriage, of a circuit including a normally open relay switch for controlling said actuating magnet, a magnet for closing said relay switch, a circuit including a control switch closable to cause the last said magnet to close said relay switch for resulting operation of said letter-feed mechanism to advance the carriage from a starting position to a position where the first digit will be sensed, and a magnet energizable upon said sensing of said digit to open said control switch.

9. In a business machine for sensing and printing a balance represented by digit designations on a record which may include a sign if said designations represent the complement of a negative balance and conditionable for printing a true negative balance complemental of the negative balance complement, the combination with a sensing device, and a record carriage advanceable relatively to said sensing device, of an operable member, means responsive to operation of said member to advance the carriage to a starting position at which said sign, if present, will be sensed, means responsive to the sensing of said sign to control operation of the machine for said negative balance printing, a carriage advance control device conditioned as a result of operation of said member, means acting under control of said conditioned control device to advance the carriage automatically from said starting position to the variant position at which the first digit designation will be sensed, and means responsive to the sensing of said first digit designation to terminate such automatic advance of the carriage.

10. In a business machine, the combination with a device for sensing digit designations on a record in the machine, and for sensing a sign provided on the record if said designations represent a negative complement, a set of computing wheels, indexable drivers therefor and a record carriage advanceable relatively to said sensing device, of an operable member, means responsive to operation of said member to advance the carriage to a starting position preceding a carriage position corresponding to a predetermined highest order in which a significant digit is ever recorded, said sign being sensable at said starting position, a carriage advance control device conditioned as a result of the operation of said member, means acting under control of said conditioned carriage control device to advance the carriage automatically from said starting position to the position where the first significant digit designation will be sensed, a nines indexing mechanism, conditioned as a result of operation of said member and automatically operative if said sign be sensed, to index in said drivers an insignificant nine for each order preceding the first significant complement digit of a negative amount, and means responsive to the sensing of a first positive or complemental significant digit designation to terminate such automatic advance of the carriage.

11. In a business machine in which typing a true numerical amount may be effected and which is case shiftable for typing the complement of said amount, the combination with a carriage, a letter-feed mechanism therefor, a set of computing wheels, indexable drivers therefor and an operatable indexer operatively connected to said letter-feed mechanism, of an actuating magnet operable for effecting operation of said letter-feed mechanism alone, an actuating magnet operable for effecting operation of said indexer and letter-feed mechanism, a relay switch and magnet, a case-shift mechanism, a switch operatively connected to said case-shift mechanism and operable thereby to one or the other of two positions to enable said relay switch to control one or the other of said actuating magnets, and operable means controlling the operation of said relay magnet.

12. In a business machine in which typing a true numerical amount may be effected and which is conditionable for typing the complement of said amount, the combination with an advanceable record carriage and a sensing device stationary relatively to the carriage, for successively sensing a sign and digit designations of an amount on a record, the sign being provided at the first sensable place on the record and only if the designation represents a negative amount, the record having possibly one or more blank spaces between said first sensable place and the first digit designation, depending on the magnitude of the amount, means operable to advance the carriage to the position for said first sensable place, means responsive to sensing of the sign to condition the machine for typing the complement of the negative amount represented, means conditioned by the operation of said carriage advancing means, and means responsive to said conditioned means to advance the carriage automatically for traversing said blank space or spaces to reach the position for sensing the first digit designation.

13. The invention as set forth in claim 12, inclusive of a set of computing wheels, indexable drivers therefor, a "9" indexer, and means conditioned by the sensing of the sign to operate said "9" indexer automatically so that indexing of "9" for each blank space will be effected.

14. In a business machine, the combination with a carriage, a letter-feed mechanism therefor and a sensing device for successively sensing designations on a record, and a key operable in pressing and return strokes, a tabulating mechanism actuatable by means of the key to advance the carriage to a starting position preceding a sensing position, said tabulating mechanism acting to check the carriage before said starting position and to let the carriage settle at said starting position at return of the key, operating means for said letter-feed mechanism, means settable at the pressing key stroke to predetermine automatic operation of the letter-feed mechanism by said operating means, and means disabled by the pressing key stroke, but restored by the return key stroke and attendant settling of the carriage to permit said automatic operation to proceed.

15. In a business machine in which typing a true numerical amount may be effected and which is conditionable for typing the complement of said amount, the combination with a carriage, a letter-feed mechanism therefor, a set of computing wheels, indexable drivers therefor, and an operable indexer operatively connected to said letter-feed mechanism, of a first actuating magnet operable for effecting operation of said letter-feed mechanism alone, a second actuating magnet operable for effecting operation of said indexer and letter-feed mechanism, a relay switch and magnet, a two-way switch in circuit with said relay switch, said two-way switch in one position connecting said relay switch with said first actuating magnet and in its second position connecting said relay switch to said second actuating magnet, means, operable upon conditioning the machine for typing the complement of an amount, for moving said two-way switch to the second position, and operable means controlling the operation of said relay magnet.

16. In a business machine, the combination with a carriage, a letter-feed mechanism therefor and a sensing device for successively sensing designations on a record, of a letter-feed relay magnet, a switch settable to make a circuit for said relay magnet for resulting advance of the carriage by said letter-feed mechanism to a position where the first designation will be sensed, and a circuit, including a switch-restoring magnet, activated in response to the sensing of the first designation at said carriage position, the relay magnet circuit being still made as the carriage reaches said position so that current is directed to both magnets by their respective circuits, the relay magnet however being relatively slower to energize than the switch-restoring magnet so that the switch is restored to break the relay magnet circuit before the relay magnet can become effective.

17. In a business machine, the combination with a sensing device, and a carriage placeable at a position to sense an initial sensable place of the record, of a carriage-feed mechanism including a control switch tending to close, a latch normally holding the switch open and tending to latching position, a magnet energizable to move the latch for permitting the switch to close, an analyzing circuit and a switch-opening magnet therein activated by the sensing of said place, an auxiliary circuit activated by the sensing of said place for energizing the first magnet, means responsive to the sensing of said place to operate the carriage-feed mechanism independently of said switch to advance the carriage from said position, and a universal switch momentarily opened, concomitantly with the carriage advance, to deenergize the magnets, the first magnet being constructed so as to be slower to deenergize than the switch-opening magnet whereby the latch remains moved long enough to permit closing of the switch at the quicker deenergization of the other magnet.

18. In a business machine, the combination with a device for electrically sensing the digits of an amount on a record sheet in the machine, a carriage, and a letter-feed mechanism therefor, of a circuit including electro-magnet means for actuating the letter-feed mechanism to effect carriage steps, a normally open switch for controlling said circuit and closable to cause said magnet means to actuate said letter-feed mechanism to advance the carriage a letter step, a normally closed switch openable to interrupt the current to said circuit, and means operable concomitantly with the start of each carriage step to open the last said switch to cause the letter-feed mechanism to conclude a carriage step, the last said means being operable concomitantly with completing a carriage step to reclose said switch to cause the letter-feed mechanism to effect a succeeding carriage step, whereby to automatically advance the carriage step by step to a position for sensing the first digit on the record sheet.

19. In a business machine, the combination with a device for electrically sensing the digits of an amount on a record sheet in the machine, a carriage, a letter-feed escapement mechanism for the carriage including a member movable in one direction incident to initiating a letter-feed step and restoring incident to terminating said step, and means including a magnet for actuating said escapement mechanism, of a circuit and devices for controlling said actuating magnet, said devices comprising a normally open switch closable to activate said magnet to cause the escapement mechanism to advance the carriage a letter step, a normally closed switch openable to interrupt current to said magnet, and connections between said movable member and said normally closed switch, said member and connections operating to open said switch upon initiating a letter-feed step to cause the escapement mechanism to conclude a carriage step, and operating to reclose said switch incident to terminating said step, the reclosing of said switch being effective to reactivate said magnet to cause a further letter-feed step, whereby the carriage is advanced step by step to a position for sensing the first digit on the record sheet.

20. In a business machine, the combination with a device for electrically sensing the digits of an amount on a record sheet in the machine, a carriage, a letter-feed escapement mechanism for the carriage including a movable dog shiftable in one direction upon initiating a letter-feed step and restoring incident to terminating said step, and means including a magnet for actuating said escapement mechanism, of a circuit and devices for controlling said actuating magnet, said devices comprising a normally open switch closeable to activate said magnet to cause the escapement mechanism to advance the carriage a letter step, a normally closed snap switch of the type operatable by a small increment of movement of said dog and which is openable to interrupt current to said magnet, and connections between said movable dog and said normally closed switch, said dog and connections operating to open said switch upon initiating a letter-feed step to cause the escapement mechanism to conclude a carriage step, and operating to reclose said switch incident to terminating said step, the reclosing of said switch being effective to reactivate said magnet to cause a further letter-feed step, whereby the carriage is advanced in successive steps to a position for effectively sensing the first digit on the record sheet.

21. In a business machine, the combination with a device for electrically sensing the digits of an amount on a record sheet in the machine, a carriage, a letter-feed escapement mechanism for the carriage including a movable dog shiftable in one direction upon initiating a letter-feed step and restoring incident to terminating said step, and means including a magnet for actuating said escapement mechanism, of a circuit and devices for controlling said actuating magnet, said devices comprising a normally open switch closable to activate said magnet to cause the escapement mechanism to advance the carriage a letter step, a normally closed snap switch of the type operatable by a small increment of movement of said dog and which is openable to interrupt current to said magnet, connections between said movable dog and said normally closed switch, said dog and connections operating to open said switch upon initiating a letter-feed step to cause the escapement mechanism to conclude a carriage step, and operating to reclose said switch incident to terminating said step, the reclosing of said switch being effective to reactivate said magnet to cause a further letter-feed step, whereby the carriage is advanced in successive steps to a position for effectively sensing the first digit on the record sheet, and electro-magnet means responsive to the sensing of the first digit to reopen the first said switch, to thereby terminate said carriage advance.

RICHARD W. PITMAN.